United States Patent [19]

Currin et al.

[11] Patent Number: 5,187,754
[45] Date of Patent: Feb. 16, 1993

[54] FORMING, WITH THE AID OF AN OVERVIEW IMAGE, A COMPOSITE IMAGE FROM A MOSAIC OF IMAGES

[75] Inventors: Bena L. Currin, Pasadena, Calif.; Aiman A. Abdel-Malek; Richard I. Hartley, both of Schenectady, N.Y.

[73] Assignee: General Electric Company, Schenectady, N.Y.

[21] Appl. No.: 693,461

[22] Filed: Apr. 30, 1991

[51] Int. Cl.$^5$ .............................................. G06K 9/36
[52] U.S. Cl. ........................................ 382/54; 382/49
[58] Field of Search ............................ 382/49, 54, 56; 358/133

[56] References Cited

U.S. PATENT DOCUMENTS

| | | | |
|---|---|---|---|
| 4,261,018 | 4/1981 | Knowlton | 358/426 |
| 4,661,986 | 4/1987 | Adelson | 382/41 |
| 4,674,125 | 6/1987 | Carlson et al. | 382/49 |
| 4,729,127 | 3/1988 | Chan et al. | 382/56 |
| 4,827,528 | 5/1989 | Macovski | 382/54 |
| 4,876,651 | 10/1989 | Dawson et al. | 382/49 |
| 4,924,521 | 5/1990 | Dinan et al. | 382/54 |
| 5,029,228 | 7/1991 | Nonoyama et al. | 382/56 |

OTHER PUBLICATIONS

Peter J. Burt and Edward H. Adelson, "A Multiresolution Spline With Application to Image Mosaics", ACM Transactions on Graphics, vol. 2, No. 4, Oct. 1983, pp. 217-236.

Bena L. Currin, "Compensation of Nonuniform Image Plane Irradiance for Aerial Mosaics", A Thesis Submitted to the Graduate Faculty of Rensselaer Polytechnic Institute in Partial Fulfillment of the Requirements for the Degree of Master of Science—May 1990, pp. 1-58.

Primary Examiner—Leo H. Boudreau
Assistant Examiner—Barry Stellrecht
Attorney, Agent, or Firm—Marvin Snyder

[57] ABSTRACT

A method for generating a composite terrain map, proceeding from an overview taken at relatively high altitude and photographs taken at relatively low altitudes, generates a composite terrain map that is relatively free of step irradiance variations where the photographs taken at relatively low altitudes are splined. Digitized representations of orthographic projections of the overview and each of the lower-altitude photographs, as regularly sampled in two orthogonal dimensions and referred to a common spatial frame of reference, are generated. The digitized representations of the orthographic projections of each of said photographs taken at relatively low altitudes are hig-pass spatially filtered, to generate digitized high-spatial-frequency responses. The digitized high-spatial-frequency responses are splined to generate a digitized high-spatial-frequency response for the composite terrain map. This digitized high-spatial-frequency response is merged with a digitized low-spatial-frequency response for the composite terrain map obtained by low-pass spatially filtering the digitized representations of the orthographic projection of the overview.

16 Claims, 10 Drawing Sheets

FIG. 6

$$\begin{bmatrix} Y \\ I \\ Q \end{bmatrix} = \begin{bmatrix} 0.299 & 0.587 & 0.114 \\ 0.596 & -0.274 & -0.322 \\ 0.211 & -0.523 & 0.312 \end{bmatrix} \begin{bmatrix} R \\ G \\ B \end{bmatrix}$$

$$\begin{bmatrix} R \\ G \\ B \end{bmatrix} = \begin{bmatrix} 1.000 & 0.956 & 0.621 \\ 1.000 & -0.273 & -0.647 \\ 1.000 & -0.523 & 1.701 \end{bmatrix} \begin{bmatrix} Y \\ I \\ Q \end{bmatrix}$$

FORMING, WITH THE AID OF AN OVERVIEW IMAGE, A COMPOSITE IMAGE FROM A MOSAIC OF IMAGES

The present invention relates to the generation of electric signals descriptive of composite images for writing a storage medium.

BACKGROUND OF THE INVENTION

The scene presented to the pilot in a flight simulator is generated by a video projector projecting spatial registered red, green and blue component images onto a screen as controlled by information stored in a computer memory. To reduce the volume of digital video data that has to be stored in the computer memory and that has to be previously processed in the flight simulator computer, color information is preferably expressed in Y,I,Q color coordinates. In the Y,I,Q color coordinates defined by the National Television Standards Committee (NTSC), Y is a luminance component, I is the color saturation component extending along the orange-cyan axis, and Q is the other color saturation component. In the flight simulator the I and Q color component samples are subsampled respective to the Y color component samples in the vertical direction of image scan, as well as the horizontal direction, in order to reduce further the number of digital samples that need to be processed in order to describe a field of view with given luminance (Y) resolution. A 4:1 subsampling of I and Q respective to Y in both horizontal and vertical directions is employed in flight simulators marketed by General Electric Company. The use of Y,I,Q color coordinates and a further transparency (T) coordinate in image descriptions provides for the simplified generation of montage images by the flight simulator, as known in the art.

Polygonal models of trees, runways, buildings, etc. are stored in the memory of the flight simulator computer, to be used in generating the video simulations of take off and landing. In more recent flight simulators textures are mapped onto the surfaces of the polygonal models by video superposition methods to give the models more realistic appearances, and these textures may be generated proceeding from images created by the scanning of these textures or photographs of them with a video camera and digitizing the video camera video signal with an analog-to-digital converter.

A polygonal model of the terrain to be overflown in the simulation is also stored in computer memory, as well as a terrain map to be texture mapped onto the polygonal model of the terrain, to generate digital samples descriptive of the pixels in the video simulation of the underlying terrain as viewed during flight. The terrain map can be generated as a composite image proceeding from a number of overlapping images, each created by scanning the aerial photographs with a video camera and then digitizing the video camera video signals with analog-to-digital conversion apparatus.

Considerable processing must be done to the individual images before splining them together to form a composite image. Gamma corrections should be made for the aerial camera film, for the video camera, and for the analog-to-digital conversion apparatus. Gamma correction is preferably made at each point in the procedure just after a gamma error has been incurred, but gamma corrections may also be made on the digitized samples generated by the analog-to-digital conversion apparatus. The distortion effects owing to camera angle and perspective are corrected for, and optical distortions in the camera lens may be corrected for. Optical color corrections as between images may be done where called for.

The intensity differences between overlapping images must be reduced in the overlap regions to implement splining. There are several mechanisms that can give rise to intensity differences between overlapping images. Illuminant changes may occur from exposure to exposure owing to overhead clouds or to intervening haze, smog or smoke. The camera may be provide automatic exposure time control that attempts to keep a photograph within the dynamic range of the film; such systems usually have center-weighted light metering which largely ignores the periphery of the image.

An important optical image plane effect is known as the $\cos^4$ law. A decreasing of image irradiance that depends upon the "field" angle between an image point and the principal point, where the optical axis meets the image plane, occurs which decrease follows the fourth power of the field angle in a simple lens in which no vignetting takes place. The effect affects compound lenses as well, though the decreasing of image irradiance as a function of the "field" angle may stray from the $\cos^4$ relationship. In wide angle lenses such as those used in aerial photography, the loss of illumination due to the $\cos^4$ law is appreciable.

"Vignetting" is the restriction, by multiple apertures, of light passing through an optical system. Image locations within a certain angle from the optical axis (which depends upon the optical system) are not affected by vignetting. The amount of light which reaches image locations outside that angular cone falls off rapidly. For complex imaging systems, vignetting can be an important problem. Interestingly, "anti-vignetting filters" are used to correct for the $\cos^4$ falloff, rather than vignetting, which is f-number dependent. The filters, which are darker in the center, gradually becoming more transparent toward the perimeter, are usually designed to correct less than the full $\cos^4$ falloff, to avoid dimming the image too much.

In aerial photographs analyzed by the inventors, however, image intensity losses are observed that are attributable to effects beside $\cos^4$ law. While the causes of these image intensity losses are not understood very well, another prime suspect is the effect of terrain angle, relative to the camera and the sun. The Malibu, Calif., region in the aerial photographs analyzed by the inventors has a sharply inclined terrain, which may contribute to the apparent variation in illumination.

A plot of the frequency with which each image intensity level occurs in an image or portion thereof, as plotted against the image intensity level scale, is referred to as the "histogram of image intensity level occurance in that image or portion thereof" and is referred to herein in abbreviated form as simply the "histogram" of that image or portion thereof. A standard method for reducing intensity differences between overlapping images involves finding a function which maps the histogram of one image to that of the other image in the overlap region they share. That mapping is then applied to the entire image, equalizing the histograms of the two images in the overlap region and normalizing the intensities throughout. However, as simply applied, this method relies upon there being little or no radiometric distortion in the images—i.e., that the intensity difference between corresponding elements of the images is substantially independent of the position of those elements in their respective images. The method, as simply applied, does not work very well in the presence of position-dependent intensity variations.

Several digital image processing methods exist for calibrating sensors to correct for radiometric distortion. These methods involve processing standard inputs with the optical system to be corrected. However, it may not be possible to obtain calibration data, especially after the images have already been obtained.

The inventors have observed that the position-dependent intensity variations tend to be a lower-spatial-frequency phenomenon. Satellite photographs provide terrain overviews that are generally considered to have insufficient resolution to generate sufficiently detailed terrain maps for a flight simulator to be able to satisfactorily simulate flight at lower altitudes, but these satellite overviews can span large areas. Over a region depicted by overlapping aerial photographs, such a satellite overview can correspond to the lower-spatial-frequency content of the aerial photographs. It is postulated that satellite data (or other very high altitude data) for the same region have more constant intensities for those lower spatial frequencies. The method of the invention discards the lower-spatial-frequency content of a mosaic of the aerial photographs, rather than attempting to correct that lower-spatial-frequency content, and combines the remnant upper-spatial-frequency content of the aerial photographs containing desired details with the low spatial frequencies of the satellite data (or other very high altitude data) as a substitute for the discarded lower-spatial-frequency content of a mosaic of the aerial photographs. This combining procedure generates a terrain map relatively free of radiometric distortion.

Satellite cameras are normally electronic cameras, rather than film cameras, and supply data in digitized form. Satellite cameras are often of the pushbroom type, using a line array of photosensors disposed perpendicularly to the direction of satellite travel to generate scan lines, with line advance being provided for by the satellite motion around its orbital path. It is usually preferable to use satellite data only in the visible spectrum, since objects reflect disparate wavelengths differently. In fact, the satellite camera images should be gamma-corrected and color-corrected to match, as closely as is practical, the color rendition of the chain including the aerial camera and its film and further including the video camera scanning the aerial photographs.

The satellite camera image must be geometrically registered to the image from the aerial photograph or mosaic of such photographs in order to implement the substitution of lower-spatial-frequency content from the satellite camera for the discarded lower-spatial-frequency content of a mosaic of the aerial photographs. As part of the registration procedure, the distortion effects owing to satellite camera angle and to perspective are corrected for in a computer provided with the digital data from the satellite camera, and optical distortions in the camera lens may be corrected for. Then, the low spatial frequency band of the mosaic of images from the aerial camera is replaced by the low spatial frequency band of the satellite camera image, after suitable relative intensity correction.

The upper-spatial-frequency content of the mosaic of aerial photograph images not only contains desired details, but also tends to contain undesirable upper-spatial-frequency artifacts attributable to the mismatching between adjacent images. Such mismatching introduces step changes into the mosaic image that, owing to the spatial bandwidth limitations imposed by the image being described in sampled data terms, appear as ringing phenomena in the spatial-frequency domain. It is desirable to suppress these undesirable upper-spatial-frequency artifacts attributable to the mismatching between adjacent images accompanying the desired details before combining the remnant upper-spatial-frequency content of the aerial photographs with the low spatial frequencies of the satellite data (or other very high altitude data) by smoothing the transitions between overlapping images.

Techniques are available to further the suppression of these undesirable artifacts which rely on equalization of the intensities of the images in their regions of overlap using histogram methods. A thesis "COMPENSATION OF NONUNIFORM IMAGE PLANE IRRADIANCE FOR AERIAL MOSAICS" submitted by Bena L. Currin in May 1990 to the graduate faculty of Rensselaer Polytechnic Institute in partial fulfillment of the requirements for a Master of Science degree is incorporated herein by reference, particularly for its description of those equalization methods. The thesis illustrates with photographs the processing of images in order to generate a terrain map of the Malibu area, for use in a flight simulator. Currin also discloses combining the upper-spatial-frequency content of aerial photographs with the low spatial frequencies of satellite data.

Another good technique for smoothing the transitions between overlapping images is described by P. J. Burt and E. H. Adelson in their paper "A Multiresolution Spline with Application to Image Mosaics", *ACM Transactions on Graphics*, pp. 217-236, October 1983. This transition-smoothing technique can be used either to avoid or to augment adjusting the intensities of the images in their regions of overlap using histogram methods. The Burt and Adelson image-splining technique makes use of a localized spatial-frequency spectrum analysis technique known as the "pyramid transform" which the reader should be cognizant of to more fully understand certain aspects of the invention disclosed in this specification.

A good thumbnail description of the Burt pyramid transform is provided in the "Description of the Prior Art" portion of the "Background of the Invention" of U.S. Pat. No. 4,674,125 issued Jun. 16, 1987, to C. R. Carlson, J. A. Arbeiter and R. F. Bessler; entitled "REAL-TIME HIERARCHAL PYRAMID SIGNAL PROCESSING APPARATUS"; now re-assigned to General Electric Company and incorporated herein by reference. U.S. Pat. No. 4,661,986 issued Apr. 28, 1987, to E. H. Adelson; entitled "DEPTH-OF-FOCUS IMAGING PROCESS METHOD" and now re-assigned to General Electric Company describes how an improved-focus two-dimensional image is derived from original images of the same field-of-view taken with the same camera differently focussed. The respective Burt pyramid transforms of the original images are obtained, each providing a spectral analysis of an original image by octaves. The Burt pyramid transform of the improved-focus two-dimensional image is assembled octave by octave, choosing the corresponding octave of the original image having the highest intensity level. The improved-focus two-dimensional image is then generated from its Burt pyramid transform by performing an inverse pyramid transform procedure. Accordingly, the generation of a synthetic image by performing an inverse pyramid transform procedure on a Burt transform assembled octave by octave from the Burt pyramid transforms of other images each of the same field-of-view is generally known. A bibliography of the early literature concerning the Burt pyramid transform is found in the "Background of the Invention" of either of the U.S. Pat. Nos. 4,661,986 and 4,674,125.

Digital filtering for the spatial-frequency spectrum analysis is associated with obtaining the Burt pyramid transform in order to implement transistion smoothing. This digital filtering can also be used for separating the upper-spatial-frequency content of aerial photographs from their lower-spatial-frequency content. Digital filtering of the satellite data for obtaining its Burt pyramid transform facilitates combining the lower-spatial frequency bands of image data in that Burt transform with the higher-spatal frequency bands of image data in the Burt transform obtained from the mosaic image generated from aerial camera photographs, without incurring visible artifacts attributable to that combining.

SUMMARY OF THE INVENTION

The invention in one of its aspects is embodied in a method for replacing the lower-spatial-frequency content of a mosaic of video images descriptive of a terrain obtained from aerial camera photographs by the corresponding spatial frequencies of a video image of an overview of that terrain obtained from satellite camera imagery. In certain variants of the method, the mosaic of video images obtained from aerial camera photographs is assembled without equalizing the intensity levels of the video images in their regions of overlap, although smoothing of the transitions between images is performed. In other variants of the method, the mosaic of video images obtained from aerial camera photographs have their intensity levels equalized to each other in their regions of overlap, using histogram methods, in which variants it is preferable that smoothing of the transitions between images is performed. In still other variants of the method, the mosaic of video images obtained from aerial camera photographs have their intensity levels equalized in their regions of overlap with the satellite, using histogram methods, in which variants it is preferable that smoothing of the transitions between images is performed. The invention in another of its aspects is embodied in a terrain map developed by that method.

The method of the invention may be used in other contexts, for combining an overview image of a spatial region with a number of detail images of subregions contained within that region, thereby to obtain a detailed image of a spatial region over a field of view normally considered too large to be obtained in such detail with the cameras and camera positions available.

BRIEF DESCRIPTION OF THE DRAWING

FIG. 6 shows color matrixing equations for converting color data for a picture element from R,G,B color coordinates to Y,I,Q color coordinates.

DETAILED DESCRIPTION

Figure 1:
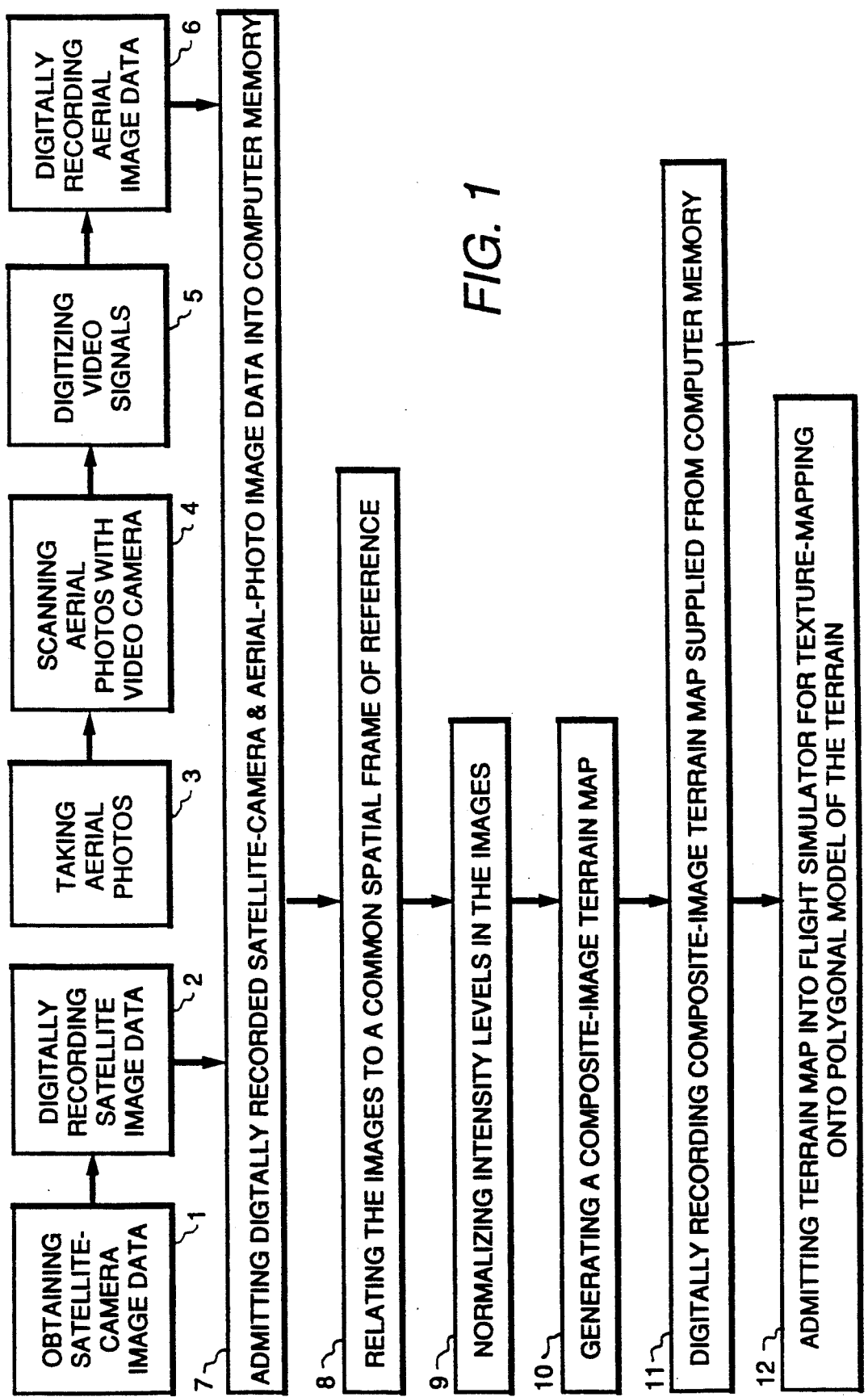
FIG. 1 is a flow chart diagramming the method of generating terrain maps in accordance with the invention.

As shown in the FIG. 1 flow diagram, a step 1 of obtaining satellite photographic images and a step 2 of digitally recording the satellite photographic images are initial steps in the method of generating terrain maps in accordance with the invention. A step 3 of taking aerial photographs, a step 4 of scanning the photos with a video camera to generate analog video signals, a step 5 of digitizing the analog video signals, and a step 6 of digitally recording the aerial photographic images are further initial steps in the method of generating terrain maps in accordance with the invention. The digitally recorded photographic images are in a form suitable for admission to a computer in a step 7 of the method of generating terrain maps in accordance with the invention, in which computer most of the remaining steps of the invention can be carried out.

Considering step 1 in greater detail, a satellite camera image is digitally coded and transmitted back to earth by radio. The digitally coded image data is detected by radio receiving apparatus and is digitally recorded to put the image data into a format that can be admitted into a computer system for processing. The step 2 of digital recording may be done following some initial processing of the detected digital transmissions usually by way of digital reformatting. Redundant coding of the image data may be decoded, transmission and errors corrected, and the corrected image data recoded in a less-redundant or non-redundant digital format, for example. By way of further example, in certain pushbroom satellite cameras a plurality of parallel linear sensor arrays are provided with different spectral filters, and color video data are transmitted to earth on a line sequential basis; the color video data may be converted to fields of image samples in each of the three additive primary colors, then recoded. Recoding may be on a field-sequential basis, a dot-sequential basis, or some other scanning basis, rather than on a line-sequential basis. Color may be recoded based on the three additive primary colors red (R), green (G) and blue (B) and possibly a fourth color luminance (Y) or white (W) in the attempt to preserve the integrity of the original satellite camera data as well as possible. Alternatively, color may be recoded into the Y,I,Q color coordinates to reduce the number of digital samples that need to be digitally recorded in order to describe a field of view with given luminance resolution. Satellite camera optical errors may also be corrected in some degree before the image data is digitally recorded in step 2, which may affect the choice of recoding format.

The step 3 of taking aerial photographs is best carried out by taking sequences of photographs with overlapping fields of view while flying straight-line courses. A sequence of parallel straight-line courses should be flown so that photographs with overlapping fields of view in the direction perpendicular to the straight-line courses are available. The aerial photographs are preferably taken at similar light levels, with similar illuminating light, and with the same film and lens filters, to assure as good color matching among these photographs as possible. The photographs should be taken at the same time of day and year as the satellite images so that shadowing effects are as similar as possible. The photographs and satellite images are preferably taken as close to local noon as possible, since shadowing effects are minimized. Inconsistencies in the shadow information contained in a terrain map, especially false shadows introduced by the combining of images to form a composite image, give a pilot training in a flight simulator false visual cues that tend to undermine the training process.

Where extensive information concerning the respective elevations of points on the terrain is not available, it is desirable to take stereoscopic photographs of regions on the terrain, from which stereoscopic photographs elevation information may later be deduced with the aid of a computer. The recording of the inertial navigation system (INS) coordinates of the aircraft carrying the camera and of the aerial camera spatial coordinates respective to the INS coordinates for each camera exposure is useful, although not necessary. Alternatively, the positioning of the camera in INS coordinates as determined by an inertial transformation matrix generator may be recorded as useful, although not necessary, information. Such apparatus is described by S. J. Rapieko, D. S. Chan, D. A. Staver and N. M. Clark in U.S. Pat. No. 5,001,647 issued Mar. 19, 1991; entitled "INERTIAL TRANSFORMATION MATRIX GENERATOR" and assigned to General Electric Company. The aircraft taking the aerial photograph may also participate in laser surveying procedures to establish the position of the camera respective to points on the terrain.

The step 3 of taking aerial photographs is followed by the step 4 of scanning the aerial photographs with a video camera and the step 5 of digitizing the analog video signal from the video camera using analog-to-digital conversion apparatus. These steps may both be carried out in a single digitizing camera, such as that manufactured by EIKONIX.

The video camera generates an analog video signal in accordance with a raster scanning of the aerial photograph or a portion thereof. The video camera preferably is a high resolution type, having at least a thousand lines of scan and providing independent video samples of at least a thousand picture elements per scan line. The spatial resolution afforded by an aerial photograph is likely to be higher than that afforded by even such a high-resolution video camera, if the field of view of the camera extends over the entire aerial photograph. Accordingly, a plurality of overlapping video-camera fields of view may be necessary to convert the image data in one aerial photograph to digital samples without suffering a significant loss in spatial resolution from the original aerial photograph. Spatial resolution in the video camera image that would be more than twice that required for the flight simulator projection equipment is not useful and is therefore not considered significant.

In line with the desire that the video camera be as high-resolution as possible, it is preferable that the video camera be one with a progressively scanned single camera tube or sensor array. This avoids the problem of spatially registering video signals from a plurality of camera tubes or sensor arrays. Video cameras with color pattern filters are best avoided because of the loss of resolution occasioned by the use of such filters. The single camera tube or sensor array is provided with a set of color filters that are sequentially employed to obtain raster scans with different color responses, which procedure is acceptable when scanning still photographs. Several similar raster scans with the same color filter may be made to allow for frame averaging in the computer processing of the digitized aerial-camera images, which frame averaging can improve video signal-to-noise ratio with regard to noise that originates in the video camera and analog-to-digital conversion apparatus and that is not correlated frame-to-frame.

The color filters may be three filters respectively transmissive of the additive primary colors, red, green and blue, sometimes referred to as physical primaries. This is advantageous in that the field-sequential color information is in a form amenable to being more directly used in the computer, particularly if frame averaging is not done. If frame averaging is done, which necessitates frame storage anyway, the color filters may be ones where additve primary information is derived by matrixing three other color responses. Such procedures are well known in the art and white (or pure luminance) may be one of the three color responses chosen. Alternatively, processing may be carried forward on a four-color basis using white in addition to the three additive primary colors.

The video camera can also be fitted with color correction filters, to reduce the amount of colorimetric adjustment that needs be made in the computer. To help implement color correction being carried out by a skilled human operator, in procedures analogous to those used in color printing from photographic films, the video camera may supply its video output signal to one of the half screens of a split-screen color video monitor, the other half screen of which is supplied video generated from image data derived from the satellite photograph or an aerial photograph with overlapping field of view. Color in the respective half-screen views of the overlapping field of view can then be matched by the human operator by adjusting d-c pedestals in the split-screen video signal for similar brightness levels in the half-screen views and selecting the best color correction filter. Color matching may be further facilitated by using a multiply segmented screen rather than just half screens. Optical color matching is useful in compensating for position-independent color variations in the images, such as variations in color film and variations of the color temperature of the scene illuminant. The color temperature of the scene illuminant may vary because of smoke, smog or haze over the terrain being photographed or because of overhead cloud cover, for example. Performing corrections of more pronounced color errors optically reduces the chances of subsequent computer-performed colorimetric corrections leading to hue errors. The trouble with simply using color correction filters that have uniform color correction across the optical field is that color correcting with them relies on the assumption that the appropriate color correction is location-independent, which is not normally the case.

Expressing all of the color video data originating from the aerial and satellite camera in terms of the three additive primary colors can simplify making colorimetric corrections with the aid of the computer, splining between the aerial-camera-originated (ACO) images, and matching of the aerial-camera images with the overview satellite camera image. The simplification is largely with regard to implementing computer/operator interfacing where images are displayed on a screen during the image processing steps. Processing is carried forward with additive primaries each having an actual physical optics basis.

If the color video data originating from the aerial and satellite camera are instead expressed in terms of Y,I,Q coordinates, the I and Q component ACO images should not be subsampled respective to the Y component ACO images until completing the processing of the color video data originating from the aerial and satellite camera to form the terrain map. Subsampling has to be deferred so that the subsamples of I and Q are at appropriate intervals over the entire expanse of the terrain map.

Expressing all of the color video data concerning ACO images in terms of the three additive primary colors allows reduction the storage requirements upon computer memory when spatial subsampling of colors cannot be done. As known in the art the additive primaries R, G, B can be sampled with intensity resolution based on their respective contributions to luminance. The bit resolution required for the red-primary data is less than that required for the green-primary data, and the bit resolution required for the blue-primary data is less still.

The analog-to-digital conversion apparatus used in the step 5 of digitizing the analog video signal is typically of the type denominated a flash converter. Gamma correction of the analog video signal from the video camera is carried out before the analog-to-digital conversion. The system including the video camera and analog-to-digital conversion apparatus usually includes frame-grabbing apparatus for helping implement the step 6 of digitally recording the aerial photographic images.

After the step 7 of admitting the digitized photographic data into the computer, a step 8 of relating the aerial photographic images and the satellite photographic images to a common spatial frame of reference is carried out in the computer. A step 9 of normalizing the intensity levels of the images is carried out in the computer, which step 9 is completed after step 8 is completed and may overlap portions of step 8, rather than following it as shown in the FIG. 1 flow diagram. In a final step 10 of generating a composite image to serve as the terrain map, the computer combines relatively low spatial-frequency content from the satellite camera images with the relatively high spatial-frequency content of a mosaic image formed from the aerial photographic images. An advantageous substep in the final step 10 of generating a composite image to serve as the terrain map is to convert the description of the colored terrain map into Y, I, Q coordinates with the I and Q component image portions thereof subsampled respective to the Y component image portions thereof in both the orthogonal directions of scan.

In a step 11 the digital signals descriptive of the component color fields of the composite image generated by step 10 are digitally recorded on a digital recording medium, such as digital electromagnetic recording tape or disk. In a step 12 the digitally recorded composite image is used by a flight simulator as a terrain map to be texture mapped onto the polygonal model of the terrain over which simulated flight is made. Having converted in step 10 the description of the colored terrain map into Y, I, Q coordinates with the I and Q component image portions thereof subsampled respective to the Y component image portions thereof in both the orthogonal directions of scan, the number of digital samples that have to be recorded in the step 11 of digitally recording the terrain map is reduced; and there is no need for converting the colored terrain map into Y, I, Q coordinates in each of the flight simulators using the terrain map per step 12.

The step 8 of relating the aerial photographic images and the satellite camera images to a common spatial frame of reference is carried out in accordance with one or both of two basic approaches: orthorectification and warping. The purpose of both approaches is the same: to remove the distortion effects owing to camera angle and to perspective from the images, and possibly to remove as well the distortion effects owing to optical distortions of the camera. In the case of satellite camera images, it is desirable to remove any distortions due to the peculiarities of the sensor system.

Figure 2:
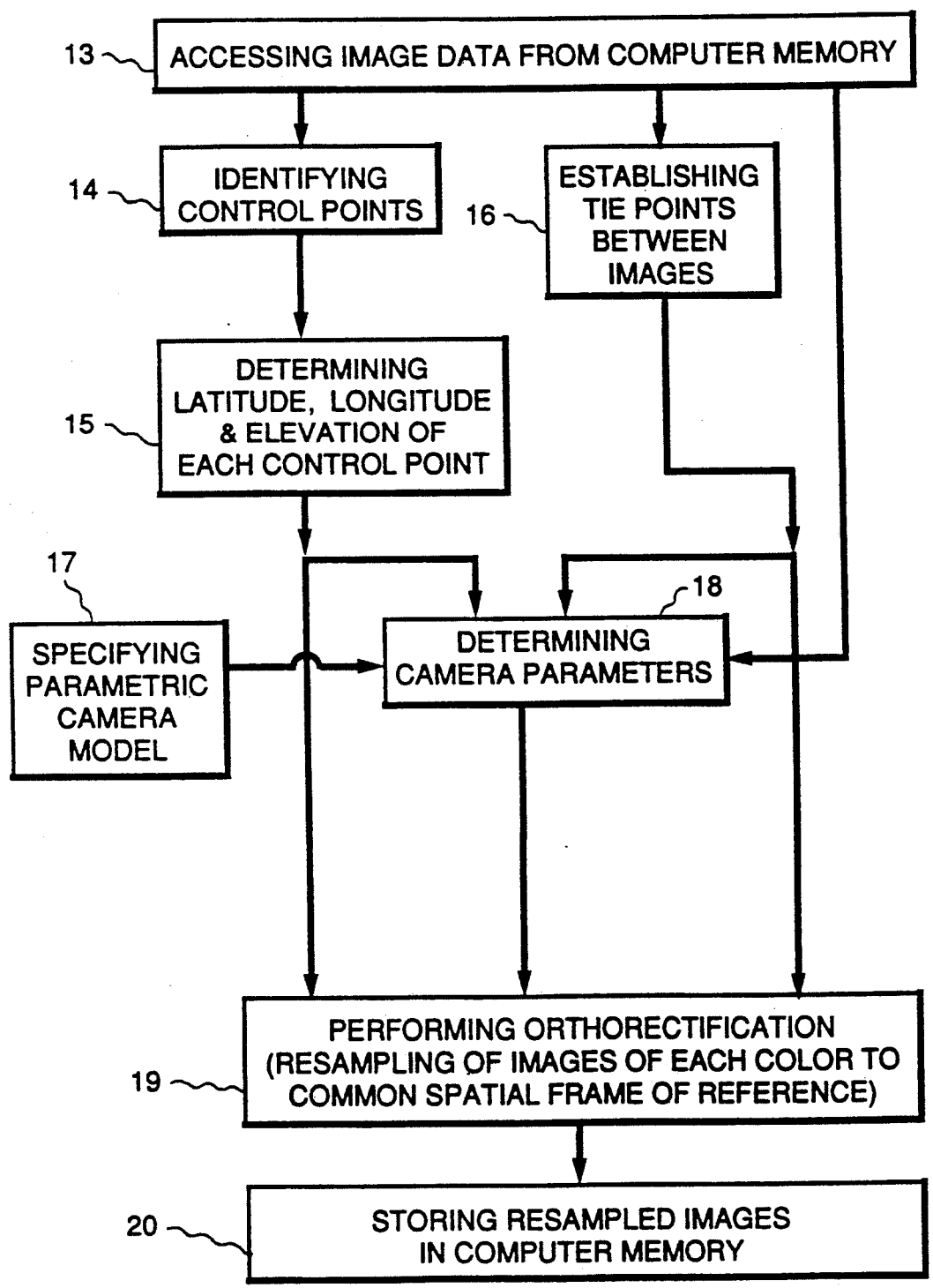
FIG. 2 is a flow chart of the procedure for resampling the aerial photographic images and the satellite photographic images to a common spatial frame of reference, which procedure includes a step of performing orthorectification of those images.

FIG. 2 is a flow chart of procedure for resampling the aerial photographic images and the satellite photographic images to a common spatial frame of reference, which procedure uses a step 19 of orthorectification. Whichever approach is pursued for relating the aerial photographic images and the satellite photographic images to a common spatial frame of reference, image data read from computer memory from time to time in a step 13 of accessing computer memory are analyzed in a preliminary step 14 of identifying a set of "control points" in the images. These control points normally take the form of identifications between image features and corresponding points on the ground. Typically, the user will identify a feature in the image as displayed on a video monitor and match it with a point on a paper map (such a U.S. Coastal and Geodetic Survey map for areas in the United States). The identification can be carried out by a human operator viewing the video monitor and indicating to the computer the position of the identified feature on the video monitor using indexing apparatus such as a mouse that controls the location of an on-screen arrow (or the intersection of a set of translatable on-screen cross-hairs) and has a push button that can be pushed to "click" when the identified feature is pin-pointed on the video monitor screen. Once the identification is made, a step 15 is pursued of getting the latitude, longitude and elevation of the point for entry into the computer. For certain points this can be accomplished by the operator entering data as ascertained by him from the paper map.

For some areas of the world, topographic maps are available in the form of computer readable files from the DMA (Defense Mapping Agency) or other suppliers; using such files together with appropriate software in the computer considerably simplifies the step 15 of establishing control points since complete information concerning their latitude, longitude and elevation of the points is then readily available. Preferably two or more "control" points per aerial photographic image can be identified and the corresponding "control" points can be identified.

Further implementation of the step 15 procedure may be done with the aid of the computer by tracing the paper map contents into the computer with appropriate apparatus and furnishing the computer information concerning the latitude, longitude and elevation of certain points from the paper map and concerning the projection methods used in producing the paper map. The computer can then determine by spatial interpolation or extrapolation subroutines the latitude and longitude of other features that are to be considered as control points. The elevation of these other features may be acquired by computer analysis of images drawn from stereoscopic photographs.

An operator may also participate in a step 16 of identifying tie points between images accessed from computer memory as a part of step 13, by comparing video camera images using suitable video viewing equipment, such as projection television equipment for generating superposed projection television images. The difference between ground control points and tie points is as follows. Ground control points are correspondence of image features to ground truth, whereas tie points are correspondences between image features in pairs of images. Work has been done in the automatic identification of tie points by computer using correlation methods involving phantom raster scanning (possibly with some image-warping) to match image features. However, matching image features with map features automatically, in order to establish control points, is considerably more difficult to do; and little has been done in this.

In the orthorectification method there is a preliminary step 17 of specifying a parametric camera model, since information is needed concerning the type of sensor (camera model) as well as information concerning the topographical data of the image region. For instance, in an ordinary frame camera, the model is that of projection onto a plane (the focal plane) from a point, the focal center of the camera. The "camera parameters" are such things as the location and orientation of the camera, the focal length (or magnification factor) of the camera and the pixel offset of the principal point. The principal point is the point in the image representing the intersection of a camera axis with the focal plane. The camera axis is the line extending through the focal center that is normal, or perpendicular, to the focal plane. Knowledge of the parametric camera model as specified in step 17 and knowledge of the control points obtained in step 15 is necessary to performing a step 18 of determining the camera model parameters, such as those concerning the latitude, longitude, altitude and direction of pointing of the aerial camera taking the photograph from which the image is extracted. It is simpler if this information was recorded at the time the aerial photograph was taken, but it can be derived from the images supplied by the aerial photographs.

Information concerning elevations of portions of the terrain can be extracted by computer proceeding from stereoscopic photographs of areas of terrain using programs such as STEREOSYS. An understanding of these procedures can be gleaned from the papers by M. J. Hannah listed below.

"Computer Matching of Areas in Stereo Images," Ph.D. Thesis, Standford University Computer Science Department Report STAN-CS-74-438, July, 1974

"Bootstrap Stereo," Proceedings: Image Understanding Workshop, College Park, MD, April 1980, pp. 201-208.

"Description of SRI's Baseline Stereo System", SRI International Artificial Intelligence Center Technical Note 342, October, 1984.

"Evaluation of STEREOSYS vs. Other Stereo Systems", SRI International Artificial Intelligence Center Technical Note 365, October, 1985.

"The Stereo Challenge Data Base", SRI International Artificial Intelligence Center Technical Note 366, October, 1985.

Other camera position parameters are determined by a process of least-squares parameter fitting given a set of ground control points. This is all described in chapter 2 of the *Manual of Photogrammetry*, 4th *Ed.* published in 1980 by the American Society of Photogrammetry, Falls Church, Va. It is also possible to determine the parameters of several cameras at once using ground control points as well as tie points.

Once control and tie points have been determined and the camera parameters are computed, a step 19 of orthorectification can be performed to compute the orthographic projection of the image. The orthographic projection is a representation of the image as seen from directly above projected with a parallel projection onto a plane. The sampled-data images as resampled by the step 19 of orthorectification are stored in computer memory in a final step 20 of the procedure of remapping the aerial photographic images and the satellite photographic images to a common spatial frame of reference.

Figure 3:
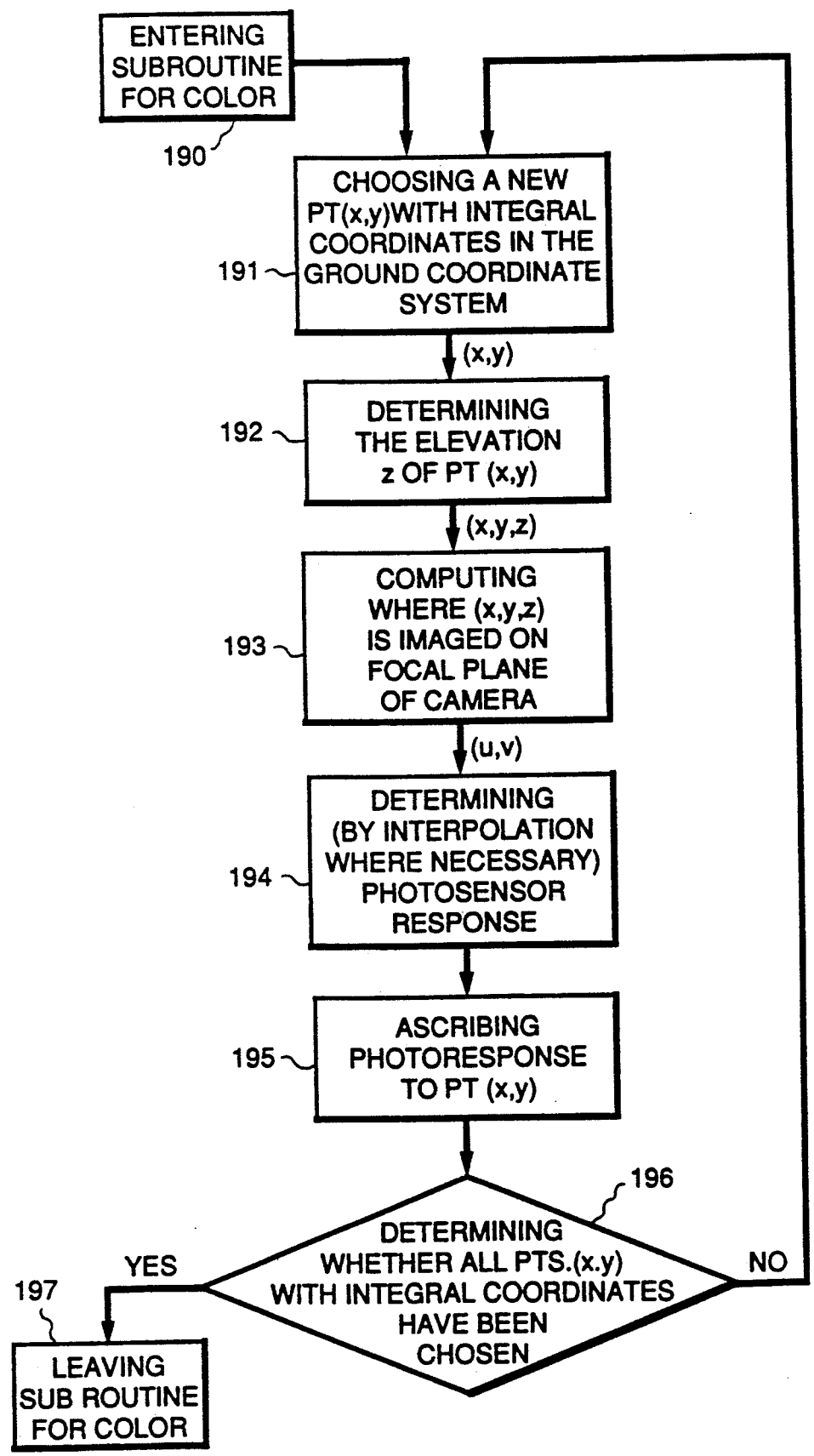
FIG. 3 is a flow chart diagramming substeps of the orthorectification step, which is carried out on a separable basis for each of the component colors of an image to compute an orthographic projection of the image.
Figure 4:
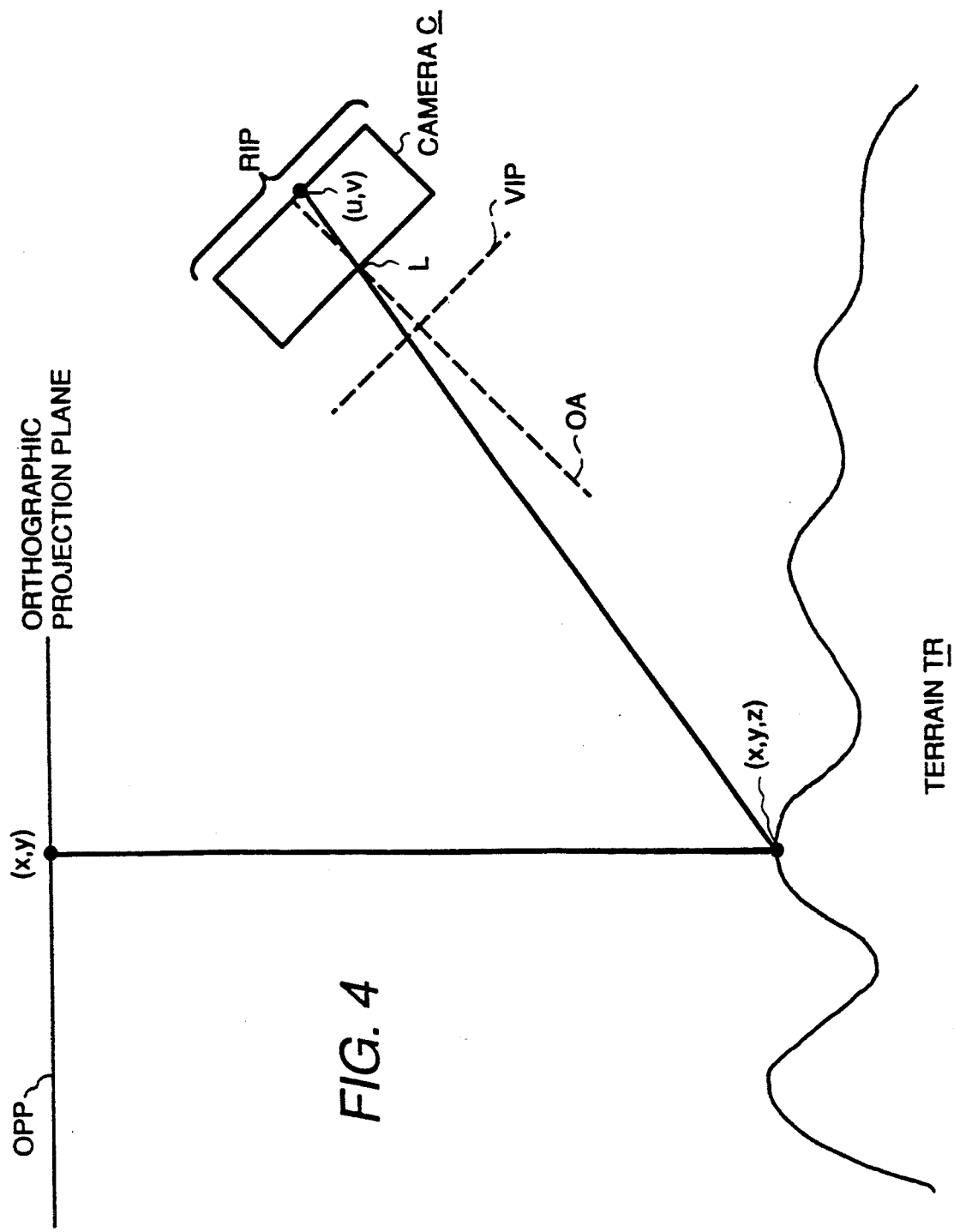
FIG. 4 is a diagram of the projections a computer performs to implement the substeps of the step of orthorectification.

FIG. 3 is a flow chart diagramming substeps of step 19 of computing the orthographic projection of a color image, which step is carried out on a separable basis for each of the primary colors using a program with instructions based on performing operations in accordance with simple trignometric relationships. FIG. 4 diagrams the projection geometry associated with the performance of these substeps by the computer. The camera C is modelled as having a simple pinhole lens L in its front wall and a real image plane RIP along its back wall on which wall a focal plane array of photosensors reposes. The optical axis OA of the camera is normal to the real image plane RIP and passes through the pinhole lens L. The departures from this simple model to accomodate converging lenses and any curvature of the camera back wall, etc, are well known to optical engineers.

Referring back to the FIG. 3 flow chart, after a substep 190 of entering the subroutine for performing orthorectification of a particular color component image, a substep 191 follows of choosing a new point $(x, y)$ on the terrain TR in the chosen ground coordinate system. The substep 191 is followed by a substep 192 of determining the elevation of the point $(x, y)$ to provide a point $(x, y, z)$ in the ground coordinate system. With consideration of the camera model, a substep 193 of computing where point $(x, y, z)$ will be imaged on the real image plane RIP of the camera is carried out.

Let ground point $(x, y, z)$ correspond to point $(u, v)$ in the image, which point $(u, v)$ is likely to be expressed in non-integral $u, v$ image co-ordinates. The integral coordinates in the image correspond to the centers of actual photosensors located on the real image plane RIP on the back wall of the camera C. A substep 194 is then performed of determining photosensor response for the primary color in question to be associated with point (u, v) in the image. Substep 194 requires interpolation among the responses of the photosensors at points in the real image plane RIP having integral coordinates closest to point (u, v) unless both u and v are integers.

To simplify the computation of the light ray projections in substep 194, a useful fiction is considering the array of photosensors as being relocated in the virtual image plane VIP, perpendicular to the optical axis OA at a distance from the pinhole lens equal to the distance from the real image plane RIP to the pinhole lens, which relocation is accompanied by a reversal of the u,v coordinates descriptive of photosensor location. All ray projections are from a ground point (x, y, z) to the point at which the pinhole lens L is located, passing through the point (−u, −v) in the virtual image plane VIP.

In an ensuing substep 195 the sensor response associated with point (u, v) is ascribed to the ground point (x, y, z) corresponding to the point (u, v) in the image. A substep 196 of determining whether all points (x, y) with integral x,y coordinates have been chosen is then performed. If not, the subroutine loops back to substep 191 to implement repeating the foregoing procedure for each intergral point (x, y) that corresponds to a point visible in the chosen particular color component image, to generate a conformal mapping between the u,v coordinate system and the x,y coordinate system. If it is determined in substep 196 that all points (x, y) with integral x,y coordinates have been chosen, a substep 197 of leaving the subroutine for the chosen particular color component image is performed. The subroutine may then be re-entered for a newly chosen particular color component image; or, if all color component images have been resampled by the orthorectification procedure, the computer can determine that the step 19 of computing the orthographic projection of a color image is completed. When doing orthorectification, it is appropriate to orthorectify all the images to a common reference coordinate set (e.g., with pixels having a given common scale, integral x coordinates in registration, and integral y coordinates in registration).

Where the orthorectification of an image from a pushbroom satellite camera or from an aerial slit camera is being done, step 193 of the orthorectification procedure is carried out in one dimension, rather than two dimensions, inasfar as a linear photosensor array and an orthographic projection line are concerned. Another variation upon the orthographic projection procedure is its combination with a further projection step for mapping the images into a spherical coordinate system to implement texture mapping a terrain map onto a portion of the surface of a sphere used for polygonal modelling of the surface of the earth.

In the orthorectification procedure the resampling of the aerial photographic images is done such that their resolution (as measured in meters/pixel, for example) in the common spatial frame of reference is an integral power of two times the resolution of the satellite imagery. This causes the sampling densities of the pyramid transforms of the aerial-camera-originated (ACO) images in their lower-spatial-frequency levels to correspond to of the pyramid transforms of the satellite-camera-originated (SCO) image. If a mosaic image formed by splining the aerial photographs and the SCO image are cropped to the same overall size, the levels of their respective pyramid transforms that correspond in resolution will correspond in size.

Warping in substantial amounts may be used instead of orthorectification, in order to map the images into a single set of spatial coordinates. The idea behind warping is to apply some mathematically defined transformation to images such that the "control points" line up as closely as possible. It is possible to match pairs of images by warping one or both of the images so that they line up well with each other. Alternatively, each image may be warped individually so that it lines up correctly with a latitude/longitude or orthogonal locally Cartesian grid.

There are various ways of warping. One way is to model the distortion by a polynomials. For instance, the modelling may be in accordance with the equations $$dx = f1\ (x, y)$$

and $$dy = f2\ (x, y)$$

where f1 and f2 are polynomial functions, x and y are the coordinates of a point in the image and dx, dy is the distortion to be applied to this point. Rather than apply one polynomial to the whole image, f1 and f2 may be splines of a plurality of different polynomials. An alternative warping function is described by A. Goshtasby in his paper "Registration of Images with Geometric Distortions", *IEEE Transactions on Geoscience and Remote Sensing*, Vol. 26, No. 1, pp. 60–64, January 1988.

Warping may be used on an auxiliary basis to perturb pixel locations in the orthorectified aerial-camera-originated (ACO) images better to fit together these images with each other and with an orthorectified image generated proceeding from the satellite-camera-originated (SCO) image data.

When the various images have been converted to a spatial coordinate system shared by them all, attention can then be turned to the procedures for combining selected portions of the images into a composite image suitable for use as a terrain map. Satellite-camera images are apt to include cloud cover over portions of them, clouds showing up as high-intensity white regions. If possible, satellite-camera images that together show all portions of the terrain free from intervening clouds are admitted into computer memory, are read from the computer memory and related to a common spatial frame of reference. The resulting orthographic projections are written back into computer memory. This is done pursuant to steps 7 and 8 of the FIG. 1 procedure.

Figure 5:
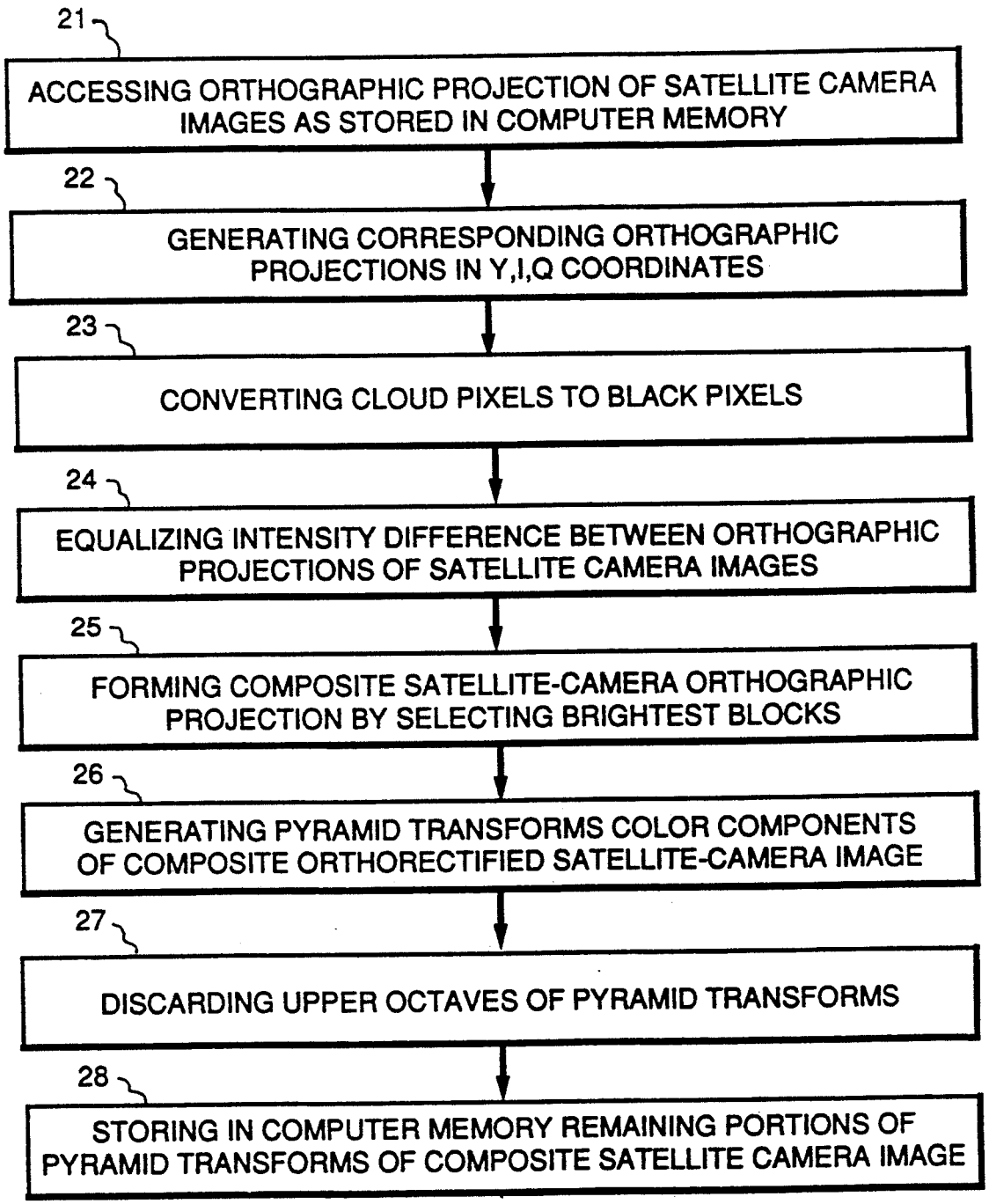
FIG. 5 is a flow chart diagramming the method of generating a composite image of an overview of earth's terrain free of cloud cover, which method superposes individual overview images obtained by satellite camera.

FIG. 5 is a flow chart showing a procedure for then generating a composite satellite camera image free from clouds, which procedure includes a step 21 of accessing the orthographic projections of the individual satellite camera images as stored in the computer memory. In image processing carried out on a pixel-by-pixel basis using a computer, the steps of the procedure usually involve continuing reading of image data from the computer memory, processing of the image data, and writing the processed image data back into the computer memory.

The pixels of the individual orthographic projections of the satellite images, as stored in computer memory may be described in R,G, B color coordinates in which R, G and B are the additive primary color components.

A step 22 is performed of generating corresponding descriptions of the individual orthographic projections of the satellite images in Y,I,Q color coordinates will then require conversion of pixel descriptions from R,G, B color coordinates to Y,I,Q. Where the satellite camera data is furnished in an R,G, B,W four-color format in which white (W) is a primary corresponding to luminance Y, only the I and Q coordinates of each pixel need be calculated in order to complete step 22. Where the satellite camera data stored in computer memory is already in Y,I,Q coordinates step 22 is omitted, of course.

FIG. 6 of the drawing shows well-known color matrixing equations for converting the color data for each pixel from R,G, B color coordinates to Y,I,Q color coordinates. Somewhat different equations may be used depending on how the additive color primaries are specified, as persons familiar with colorimetry appreciate.

Pixels descriptive of clouds in an image generated by satellite camera will have high-amplitude Y components and low-amplitude I and Q components; these pixels are replaced by black pixels for which $Y=0$, $I=0$ and $Q=0$ in a step 23 of the procedure shown in the FIG. 5 flow chart, and the images with white clouds inverted to black are stored in the computer memory. There is not much radiometric distortion in the satellite camera images—i.e., that the intensity difference between corresponding elements of the images is substantially independent of the position of those elements in their respective images—so the intensity differences between the satellite camera images can be suppressed by equalizing their histograms in the non-black overlap regions in a step 24 of the procedure shown in the FIG. 5 flow chart.

In a succeeding step 25, the resulting processed satellite images in Y,I,Q color format are then divided into blocks for comparison with the corresponding blocks of each of the other similarly processed satellite images showing the same region of the earth. For example, the image can be split into 16-pixel-by-16-pixel blocks for purposes of analysis. The one of the compared blocks with the largest Y component is selected as best representing a correct block in a composite image based just on satellite camera overviews (hereinafter termed the "SCO" image), since it will not be a pixel that is descriptive of a cloud top or a pixel descriptive of cloud (or other) shadow on the surface of the earth. The technique for splining the selected blocks of satellite camera imagery is similar to that to be described for the images taken from aerial photographs. It is useful to retain in computer memory both the Y, I, Q components of the SCO image and the corresponding R, G, B components of the SCO image.

A SCO image, prepared by the technique just described or its like, provides a good estimate of the low-spatial-frequency content of the terrain map it is sought to prepare. This low-spatial-frequency content of the terrain map is presumed to include as its upper spatial-frequency end one or more octaves of midrange-spatial-frequencies shared by the images originating from the aerial cameras. It is useful to bandpass filter the R, G, B components of the SCO image and the corresponding Y,I,Q components of the SCO image, preferably by octaves, to isolate this mid-spatial-frequency band. The mid-spatial-frequency band of the SCO image R, G and B components provide standards against which to adjust the color of orthorectified aerial-camera-originated (ACO) images. The mid-spatial-frequency band of the SCO image I and Q components provide data for calculating an angular description of hue, which can be compared to angular descriptions of hue of the orthorectified ACO images as an aid in adjusting the color of the orthorectified ACO images to correspond to the color of the SCO image. The mid-spatial-frequency band of the SCO image Y component provides a standard against which to equalize the mid-spatial-frequency band of the Y component of the ACO images, in the typing together of the high-spatial-frequency content of the terrain map obtained from the ACO images with its low-spatial-frequency content obtained from the SCO image.

While both R,G,B and Y,I,Q coordinates can be developed and used in the procedures that are described hereafter, it is not necessary that image data as described in each set of coordinates be developed and carried forward. Since the final terrain map is best expressed in Y,I,Q coordinates, one may choose to carry out all subsequent operations (including splining of the ACO images) only in Y,I,Q coordinates after converting any image data in another form to Y,I,Q coordinates. Alternatively, for reasons previously noted, one may choose to carry out all subsequent operations (including splining of the ACO images) just in R,G,B coordinates up to a point where a terrain map is completed except for conversion to the Y,I,Q coordinates it is best expressed in.

One may choose to use still another system of color components up to a point where a terrain map is completed except for conversion to the Y,I,Q coordinates it is best expressed in. For example, such other system may be one employing Y, I/Y and Q/Y; one employing Y, R/Y, G/Y and B/Y; or one employing Y and a color table address for storing hue and color saturation information, so the calculations of pyramid transforms and of inverse pyramid transforms need only be done for Y.

In the FIG. 5 flow chart a step 26 of taking the pyramid transforms of the various color components of the composite satellite-camera orthographic projection (i.e., the SCO image), to provide the spatial-frequency spectral analysis of its different color component images by octaves. Portions of the pyramid transforms of the color components of the SCO image that are below the mid-spatial-frequency band are not further resolved into octaves (or Laplacian responses), but are left as remnant Gaussian responses.

The step 26 is shown in the FIG. 5 flow chart as being followed by a step 27 of discarding upper octaves of the pyramid transforms for the SCO image, which contain attenuated energies descriptive of the terrain. Then, in an ensuing step 28 the remaining portions of the pyramid transforms for the SCO image are stored in computer memory.

Where they have substantial overlap, the orthographic projections of the aerial-camera-originated (ACO) images stored in computer memory in the step 20 of the FIG. 2 procedure can be cropped in a variety of ways before fitting them together to form a mosaic image. An approach being used to determine where the boundary between overlapping images is to be placed, with reference to which boundary the images are then cropped in the splining procedure, begins by dividing the image into 16-pixel-by-16-pixel blocks for purposes of analysis. If a block is visible in two or more of the orthorectified images, then the view of the block chosen is the one in which the block is closest to the principal point. The theory is that near the center of the image, the distortions will be less severe. To the extent the orthorectified images do not line up exactly as desired, slight amounts of warping may be resorted to.

After cropping, the securing of the high-spatial-frequency content of the terrain map from the cropped ACO images can be accomplished by a number of methods. One method is to simply assemble the ACO images in a mosaic without bothering to adjust their respective image intensities. When this method is followed, colors are apt not to match along the edges between images cropped so they can be abutted to form the mosaic image. Rather than just cropping the images before abutting them to form the mosaic image, one can attempt to take advantage of the fact that there are image data descriptive of two overlapping images available and try to make the mismatch less noticeable by providing for some sort of smooth transition between the images. The obvious approach is to try to make some sort of smooth transition such as a linear transition from one of the images to another within a band extending on either side of the boundary, using an interpolation function on the samples of the three color components of the color image. Unfortunately, in practice, this straightforward method will not satisfactorily reduce the visibility of seams between the images to an occupant of the cockpit in the flight simulator.

A generally satisfactory method for reducing the color mismatches is described by P. J. Burt and E. H. Adelson in their paper "A Multiresolution Spline with Application to Image Mosaics", *ACM Transactions on Graphics*, pp. 217-236, October 1983. They teach splitting each of the color components of the image into separate frequency bands called octaves (i.e. 2 to 1 frequency ranges). Abrupt color changes at the transitions from one image to another introduce ringing energy near the edge in all spatial frequency octaves. The ringing effects are more localized and larger in amplitude in the higher-spatial-frequency octaves. The images are splined together at each octave range separately using the Burt-Adelson method, providing for transition at different rates for different spatial frequency components of the image. The transition region is narrower for the high spatial frequency bands, its width being inversely proportional to the spatial frequency of the band. Finally, the composite images are reconstructed from the separate frequency bands. This method has the advantage of minimizing spatial and radiometric (color) mismatches that make seams between images visible to an occupant of the cockpit in the flight simulator. The method does not eliminate the color mismatches entirely, but simply softens the transition. The transition is low-pass filtered, with decreasing effect in the lower spatial frequencies, where the color mismatch persists.

In accordance with the invention herein claimed, the lower spatial frequency of the mosaic formed from the ACO images is discarded, together with its persistent color mismatch content, and is replaced with the lower spatial frequency of the SCO image. This can be done simply by discarding the lower octaves of the mosaic formed from the ACO images and replacing them with the corresponding lower octaves of the SCO image. But some irregularities in the appearance of the resulting terrain map may be noticeable, especially where gamma correction of the ACO and SCO images is not complete. Further on in this specification, there is described, with reference to FIG. 9 of the drawing, a preferable transition method for melding the relatively high spatial frequency content of imagery obtained from an aerial camera with the relatively low spatial frequency content of imagery obtained from a satellite camera.

Figure 7:
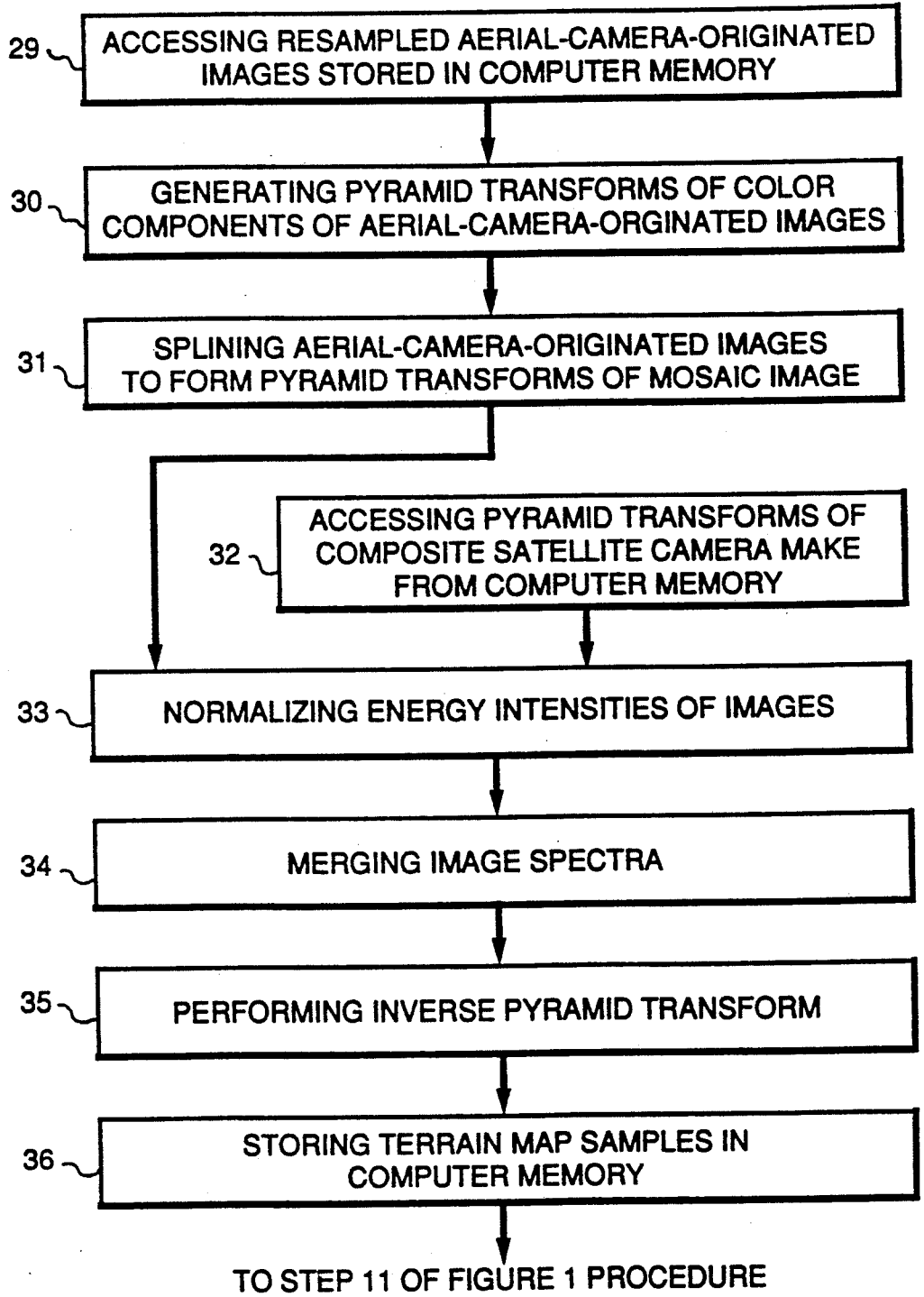
FIGS. 7 and 8 are flow charts diagramming different methods of combining the composite image of an overview of earth's terrain free of cloud cover formed from satellite camera data with details taken from aerial-camera photographs.

FIG. 7 is a flow chart showing the steps of the method outlined above for melding the ACO and SCO images. A step 29 of this procedure is the accessing of the resampled ACO images stored in computer memory during step 20 of the FIG. 2 orthorectification procedure. A step 30 of generating the pyramid transforms of color components of the ACO images accessed in step 29 follows. The pyramid transform of each field of samples of a particular color component can be generated beginning by successively low-pass filtering the field in two spatial dimensions, subsampling each low-pass filter response 2:1 in each spatial dimension, and performing each successive low-pass filtering step proceeding from the subsampled response of the preceding low-pass filtering step. Two-dimensional band-pass filter responses (sometimes referred to as "Laplacian" responses) are then obtained by subtractively combining the responses of successive low-pass filtering steps, and together with a remnant low-pass filter response from the final low-pass filtering step (sometimes referred to as a "Gaussian" remainder response) provide the complete pyramid filter response. The octave-wide Laplacian responses are extracted only for the high spatial frequencies containing image details and for the middle spatial fequencies containing less detailed information found also in the SCO image. A lower-spatial-frequency Gaussian response is remnant after extraction of the octave-wide Laplacian responses. (The 2:1 subsampling of the Gaussian remainder response in each spatial dimension may be omitted.) In a step 31 the spectral components of the ACO images are splined by the Burt-Adelson method to form pyramid transforms of the color components of a mosaic image. The pyramid transforms of the SCO image color components that were stored in the computer memory during the step 28 of the FIG. 5 method are accessed from the computer memory during a step 32 of the FIG. 7 method.

A step 33 of normalizing the respective energy intensities of the SCO image and of the mosaic image formed from the splined ACO images is carried out as a preliminary step before a step 34 of merging their spatial-frequency spectra. The merged spectrum comprises the low-spatial-frequency octaves from the SCO image, the high-spatial-frequency octaves from the mosaic image formed from the splined ACO images, and medium-spatial-frequency octaves. These medium-spatial-frequency octaves could be from either the SCO image or the mosaic image, but preferably are obtained by interpolation from both the SCO and mosaic images as will be described in detail further on in connection with FIG. 9 of the drawing. A step 35 of performing the inverse pyramid transform on the merged spatial-frequency spectrum generates a terrain map, which in a step 36 of the FIG. 7 method is stored in the computer memory to be available in the step 11 of the FIG. 1 method.

Before replacing an ACO-mosaic-image spatial-frequency band with the corresponding SCO-image spatial-frequency band (or a weighted sum of the two per FIG. 9) in the step 34, as has been noted it is necessary to normalize the power in the two image spatial-frequency bands in the step 33. In general, this means matching the two bands in terms of their mean and variance. (Since variance may be identified as the (non-DC) power content of the image). In the case of Laplacian components of the image (i.e. octave frequency bands) the mean of the band is zero, so in normalization, it is necessary only to equalize the variance of the two bands. In the case of Gaussian components, it is necessary to normalize both the mean and the variance. To perform this normalization, it is first necessary to compute the mean and variance of the pixels of each of the two bands, (the one to be replaced and the one that will replace it). These values are the mean, $\mu$, and the variance, $v$, defined as follows, where N is the number of pixels in the image.

$$\mu = (1/N) \sum_{i,j} A_{ij}$$

$$v = (1/N) \sum_{i,j} (A_{ij}^2) - \mu^2$$

Suppose that A and B are two image components and that A is to be replaced by B. Let $\mu_A$ and $\mu_B$ be the respective means of the two images; let $v_A$ and $v_B$ be the respective means of the two images; and let $\sigma_A$ and $\sigma_B$ be the standard deviations (square roots of the variance) of the two images. Before replacing the image component A with the image component B, the image component B has to be normalized respective to the image component B so that the mean and variance of the image component B equal the mean and variance of the image component A. This is done on a pixel-by-pixel basis in accordance with the following formula in which B'(i,j) is the normalized value of the pixel (i,j) of the image B.

$$B'(i,j) = [B(i,j) - \mu_B] \cdot (\sigma_A/\sigma_B) + \mu_A.$$

If the image components A and B are respective Laplacian responses, their respective means will each be zero-valued, simplifying the above formula to the simpler form following.

$$B'(i,j) = (\sigma_A/\sigma_B) B(i,j).$$

Figure 8:
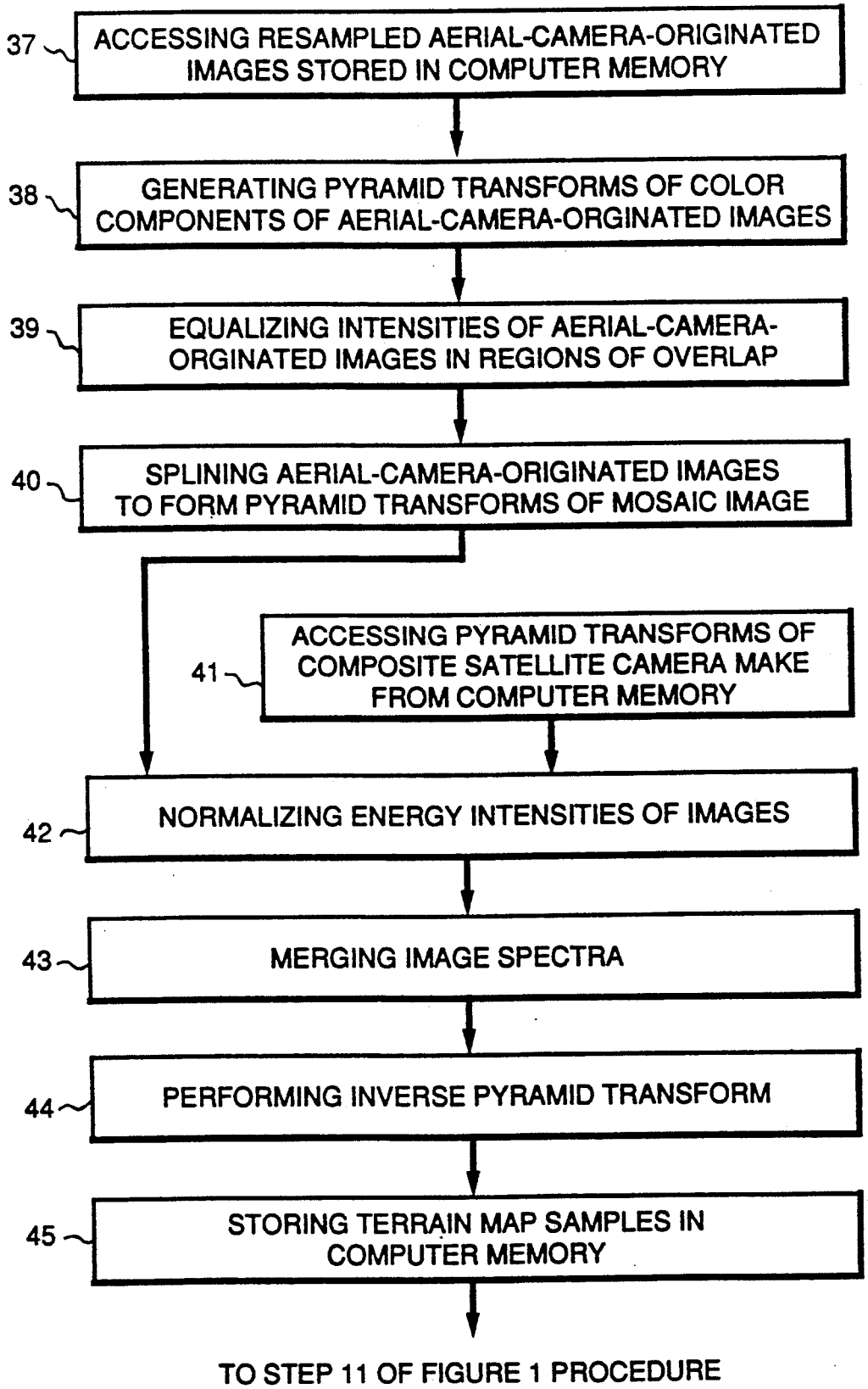

FIG. 8 is a flow chart of a method for melding the ACO and SCO images alternative to that of FIG. 7. ACO images are accessed during a step 37 of the FIG. 8 method, to be followed by a step 38 of generating the pyramid transforms of color components of the ACO images and a step 39 of equalizing the intensity levels of the ACO images in their regions of overlap.

Variations among the ACO images with regard to overall brightness arise from exposure differences that may be introduced by film speed variations, by the aerial camera in order to keep the image within the dynamic range of the film, or by various combinations of these causes. Additionally, localized variations between the ACO images in their regions of overlap may be introduced by vignetting, by $\cos^4$ law effect, by longer light path lengths through a filtering atmosphere, by failure of reciprocity of film exposure owing to different local light levels in overlapping images, or by various combinations of these causes. The ideal complete equalization procedure is essentially one comprising a substep of eliminating overall brightness, hue and color saturation errors among the ACO images, followed by substeps processing the images to adjust for localized color variations, until the histograms of each best match the histograms of its neighboring images in the regions they overlap. A step of discarding the lower-spatial-frequency remanant Gaussian response of the ACO images, that has to take place somewhere in the chain of ACO image processing that develops a mosaic image in which low-spatial-frequency content is suppressed before merger with the low-spatial-frequency content from the SCO image, makes irrelevant any substep of eliminating overall brightness, hue and color saturation errors in a step of equalizing the intensity levels of the ACO images in their regions of overlap.

Equalization to adjust for localized color variations can be carried out by a number of methods, several of which are described in the Currin thesis. One trial-and-error method is to process the images with a succession of gradient filter responses until the histograms of each best match the histograms of its neighboring images in the regions they overlap. This is an electronic analog of the optical practice of introducing shading filters into the optics of the video camera used to convert the aerial photographs to video signals. The processing of an image with a gradient filter response is carried out by multiplying each of the pixels of that image by a respective factor as determined by the gradient pitch and direction parameters for that gradient filter response. One can arrange for the computer to perform the inverse pyramid transform on the Laplacian responses for the component color images of each image to obtain respective high-pass-filtered responses for each component color image of each ACO image, the pixels of which high-pass-filtered component color images are then multiplied by respective factors in each gradient filtering substep. When performing equalization this way, it is further arranged for the computer to perform the pyramid transform on the equalized high-pass-filtered component color images, to get back octave-wide Lapacian responses for a subsequent step 40 of splining the equalized ACO images to generate the pyramid transforms of the color components of a mosaic image. Alternatively, since the pyramid transform is distributive in nature, the Laplacian responses may be individually processed by the same gradient filter function (as appropriately sampled) to seek best matches between the histograms of a pair of images for the regions for which they both provide image data.

Equalizing the intensity levels of the retained octave-wide Laplacian responses descriptive of the ACO images in their regions of overlap tends to reduce the color mismatches at the edges of the images as cropped for inclusion in the mosaic image, so less ringing energy (as a component of the step changes between images) is introduced into each Laplacian response. This helps further to reduce the visibility of seams between the images to an occupant of the cockpit in the flight simulator. A problem that can occur with ACO image equalization is a tendency towards increase in the dynamic range required for the mosaic image, which can lead to clipping of ACO image data.

After the step 39 of equalizing the intensity levels of the ACO images in their regions of overlap, the step 40 of splining the equalized ACO images in accordance with the Burt-Adelsen method is performed, in order to generate the pyramid transforms of the color components of a mosaic image. The pyramid transforms of the SCO image color components that were stored in the computer memory during the step 28 of the FIG. 5 method are accessed from the computer memory during a step 41 of the FIG. 8 method. A step 42 of normalizing the respective energy intensities of the SCO image and of the mosaic image formed from the splined ACO images is carried out previous to a step 43 of merging their spatial-frequency spectra, which normalization procedure is facilated by the reduced ringing energy introduced as a spurious artifact into the mosaic image. The merged spectrum comprises the low-spatial-frequency octaves from the SCO image, the high-spatial-frequency octaves from the mosaic image formed from the splined ACO images, and medium-spatial-frequency octaves. These medium-spatial-frequency octaves could be from either the SCO image or the mosaic image, but preferably are obtained by interpolation from both the SCO and mosaic images as will be described in detail further on in connection with FIG. 9 of the drawing. A step 44 of performing the inverse pyramid transform on the merged spatial-frequency spectrum generates a terrain map, which in a step 45 of the FIG. 8 method is stored in the computer memory to be available in the step 11 of the FIG. 1 method.

Figure 9:
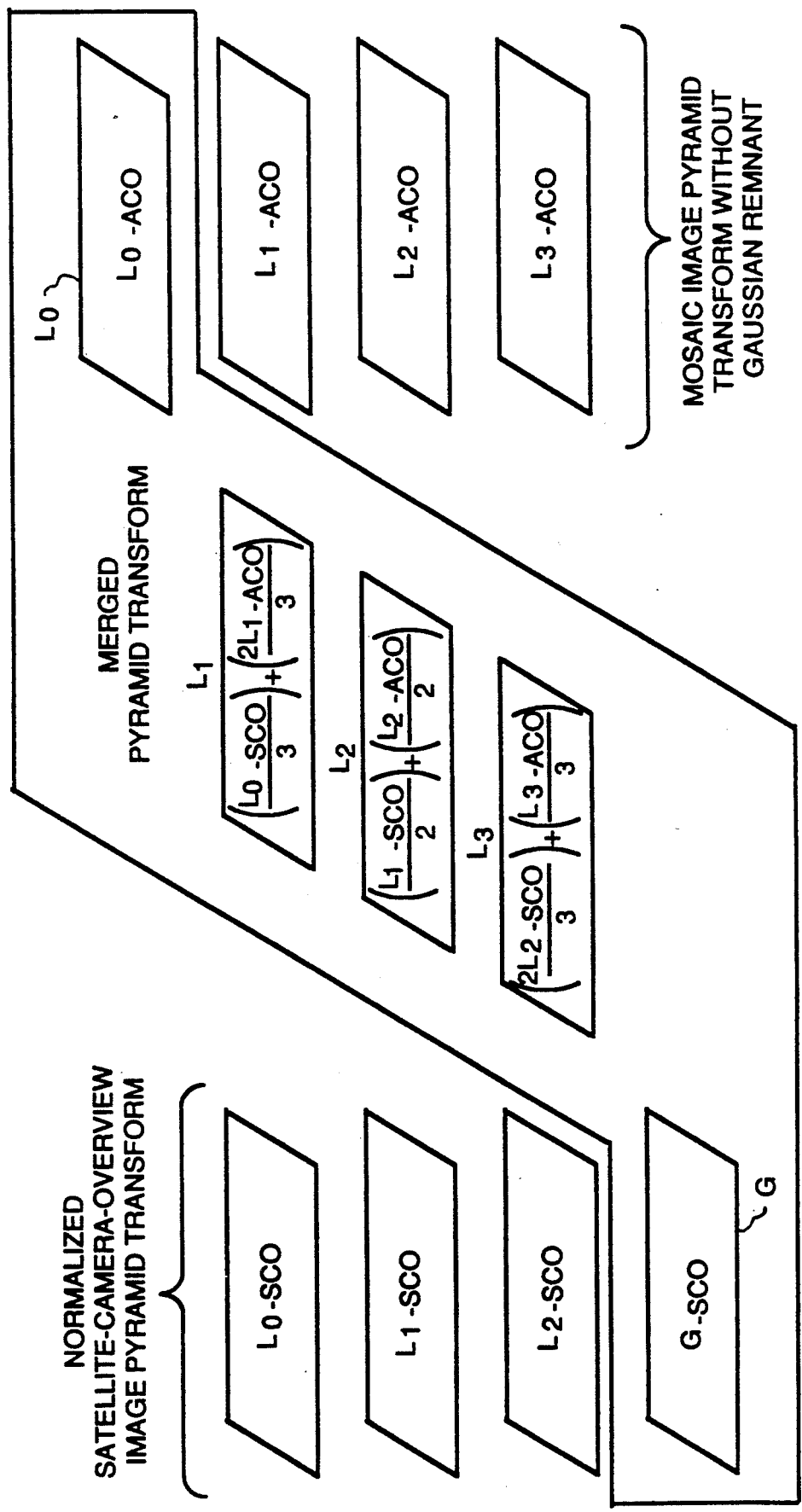
FIG. 9 is a diagram of the spatial filtering technique used to meld the relatively high spatial frequency content of imagery obtained from an aerial camera with the relatively low spatial frequency content of imagery obtained from a satellite camera.

FIG. 9 illustrates a spatial filtering technique for melding the relatively high spatial frequency content of imagery obtained from an aerial camera with the relatively low spatial frequency content of imagery obtained from a satellite camera, which technique most smoothly blends the ACO image mosaic with the SCO overview image. A pyramid transform of the SCO image comprises a zeroeth-order Laplacian response $L_{0\text{-}SCO}$, a first-order Laplacian response $L_{1\text{-}SCO}$ an octave lower in spatial frequency, a second-order Laplacian response $L_{2\text{-}SCO}$ an octave still lower in spatial frequency, and a remnant Gaussian response $G_{SCO}$ comprising all spatial frequencies yet lower. A partial pyramid transform of the ACO image comprises a zeroeth-order Laplacian response $L_{0\text{-}ACO}$, a first-order Laplacian response $L_{1\text{-}ACO}$ an octave lower in spatial frequency, a second-order Laplacian response $L_{2\text{-}ACO}$ an octave still lower in spatial frequency, and a third-order Laplacian response $L_{3\text{-}ACO}$ yet an octave lower in spatial frequency. (The remnant Gaussian response $G_{ACO}$ comprising the lowest spatial frequencies has been discarded in this partial pyramid transform of the ACO image.) A merged pyramid transform comprises a zeroeth-order Laplacian response $L_0$ corresponding to the zeroeth-order response $L_{0\text{-}ACO}$ of the mosaic image pyramid transform, a first-order Laplacian response $L_1$, a second-order Laplacian response $L_2$, a third-order Laplacian response $L_3$ and a remnant Gaussian response $G$ corresponding to the remnant Gaussian response $G_{SCO}$ of the SCO image pyramid transform. The sampling densities of the first-order Laplacian response $L_{1\text{-}ACO}$ of the mosaic image and of the zeroeth-order Laplacian response $L_{0\text{-}SCO}$ of the SCO image correspond to each other; the sampling densities of the second-order Laplacian response $L_{2\text{-}ACO}$ of the mosaic image and of the first-order Laplacian response $L_{1\text{-}SCO}$ of the SCO image correspond to each other; and the sampling densities of the third-order Laplacian response $L_{3\text{-}ACO}$ of the mosaic image and of the second-order Laplacian response $L_{2\text{-}SCO}$ of the SCO image correspond to each other. The zeroeth-order Laplacian response $L_{0\text{-}SCO}$ of the SCO image and the first-order Laplacian response $L_{1\text{-}ACO}$ of the mosaic image are weighted by one-third and by two thirds, respectively, in a pixel-by-pixel weighted summation that generates the pixel samples of $L_1$. The first-order Laplacian response $L_{1\text{-}SCO}$ of the SCO image and the second-order Laplacian response $L_{2\text{-}ACO}$ of the mosaic image are each weighted by one-half in a pixel-by-pixel weighted summation that generates the pixel samples of $L_2$. The second-order Laplacian response $L_{2\text{-}SCO}$ of the SCO image and the third-order Laplacian response $L_{3\text{-}ACO}$ of the mosaic image are weighted by two thirds and by one-third, respectively, in a pixel-by-pixel weighted summation that generates the pixel samples of $L_3$. The octaves $L_1$, $L_2$ and $L_3$ in the middle spatial frequencies of the merged pyramid transform are progessively weighted towards containing samples preponderantly dependent on the mosaic image as spatial frequencies tend to become higher and towards containing samples preponderantly dependent on the SCO image as spatial frequencies tend to become lower. Generating the inverse pyramid transform of the merged pyramid transform generates the terrain map.

Figure 10:
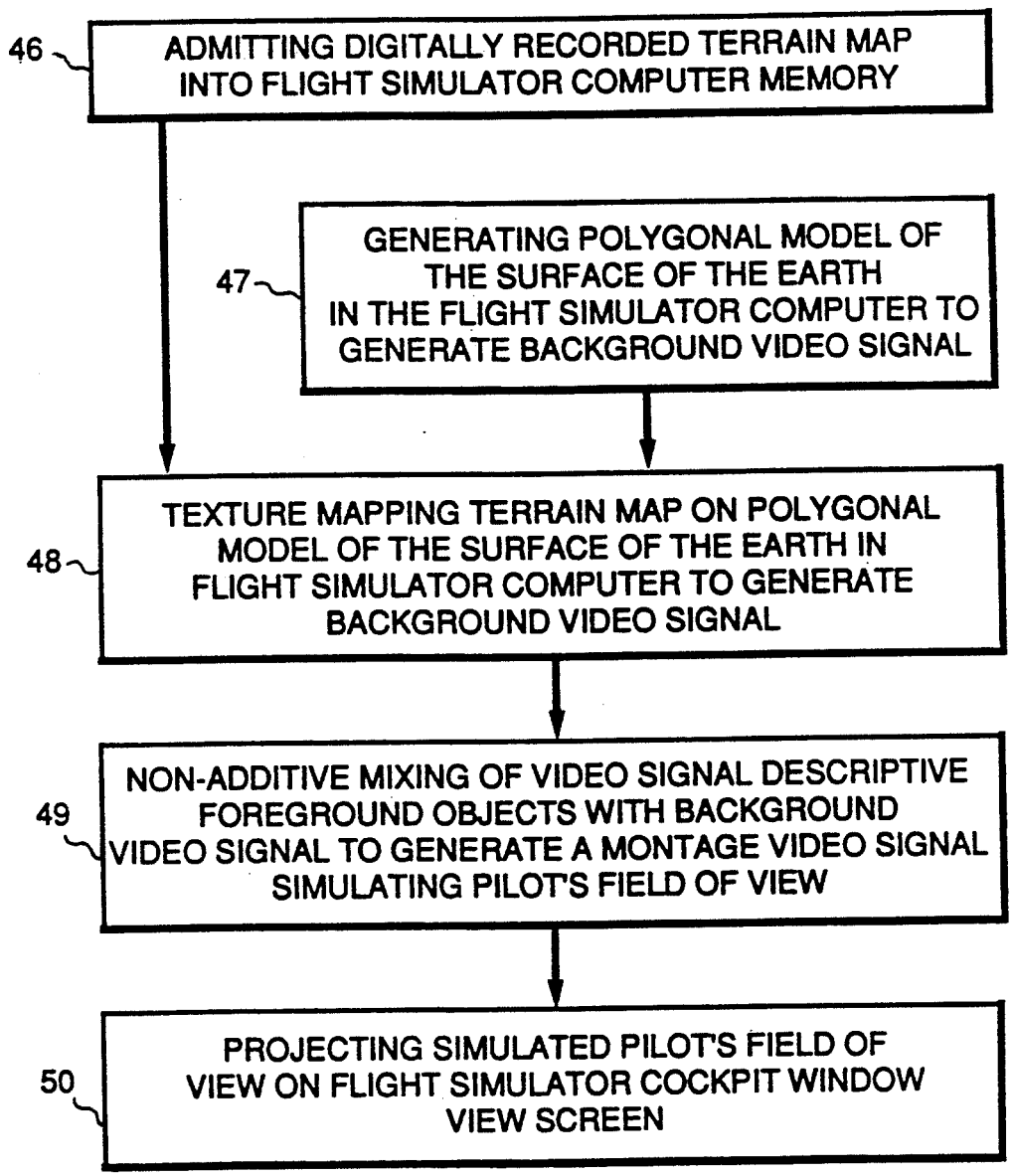
FIG. 10 is a flow chart showing how a terrain map generated in accordance with the invention is utilized in a flight simulator.

FIG. 10 is a flow chart showing how a terrain map generated in accordance with the invention is utilized in a flight simulator, which includes a digital computer and a display screen onto which may be projected video simulating the field of view from the cockpit windows of the aircraft being simulated. A step 46 of admitting the digitally recorded terrain map into the flight simulator computer and a step 47 of generating in the flight simulator digital computer a polygonal model of the surface of the earth precede a step 48 of texture mapping the terrain map onto the polygonal model to generate a background video signal. The digital computer of the flight simulator then performs a step 49 of non-additive mixing video signal descriptive of foreground objects with the background video signal to generate a montage video signal. The step 49 is followed by a step 50 of projecting a simulation of a pilot's field of view from cockpit windows on the cockpit window view screen of the flight simulator in accordance with the montage video signal.

In order that the claims which follow be less complicated and easier to understand, some shorthand terms are used. Reference to "the pyramid transform of an image" should be interpreted as collectively referring to the pyramid transforms of its component color images (e.g., the pyramid transform of the red component image, the pyramid transform of the green component image, and the pyramid transform of the red component image; or, e.g., the pyramid transform of the Y component image, the pyramid transform of the I component image, and the pyramid transform of the Q component image). Reference to "the Laplacian component of an image" should be interpreted as collectively referring to the Laplacian component of the red component of that image, the Laplacian component of the green component of that image, and the Laplacian component of the blue component of that image, as all fall within the same octave. Reference to "the remnant Gaussian component of an image" should be interpreted as collectively referring to the remnant Gaussian component of the red component of that image, the remnant Gaussian component of the green component of that image, and the remnant Gaussian component of the blue component of that image, as all fall within the same spatial frequency baseband.

Reference to "the Burt-Adelson procedure" in the claims is intended to include within its scope not only that procedure as specifically applied to the Burt pyramid transforms of images to be splined, but also corresponding procedures applied to other types of pyramid transforms of images to be splined. The images are splined together separately at each octave range of the pyramid transforms of images to be splined, providing for transition at different rates for different spatial frequency components of the image. The transition region is narrower for the high spatial frequency bands, its width being inversely proportional to the spatial frequency of the band.

What is claimed is:

1. A method for generating a composite image, proceeding from a less-detailed overview image of a relatively large field of view and from more detailed images of relatively small fields of view, said method comprising the steps of:

combining the more detailed images to form a mosaiced detailed image in a common spatial reference frame with the overview image;

generating digitized representations of the less detailed image and the mosaiced image in electrical signal form of each of said images, each as regularly sampled in two orthogonal dimensions and referred to a common spatial frame reference;

low-pass spatially filtering the digitized representations of said overview image to generate in electrical signal form a digitized low-spatial-frequency response for said composite image;

high-pass spatially filtering the digitized representations of the regular sampling of said mosaiced image, to generate in electrical signal form digitized high-spatial-frequency response for said composite image; and combining said high-spatial-frequency and low-spatial-frequency responses for said composite image.

2. A method for generating a composite image as set forth in claim 1 including the preliminary steps of:

obtaining data from a satellite camera for use in generating digitized representations in electrical signal form of said less-detailed overview image of a relatively large field of view; and obtaining data from an aerial camera for use in generating digitized representations in electrical signal form of said more detailed images of relatively small fields of view.

3. A method for generating a composite image, proceeding from a less-detailed overview image of relatively large field of view and from more detailed images of relatively small fields of view, said method comprising the steps of:

combining the more detailed images to form a mosaiced detailed image in a common spatial reference frame with the overview image;

generating digitized representations in electrical signal form of the pyramid transforms of each of the less detailed image and the mosaiced image as regularly sampled in two orthogonal dimensions and referred to a common spatial frame of reference, each pyramid transform including a number of levels respectively constituting descending octaves of higher-spatial-frequency content, the descending octaves of higher-spatial-frequency content of each of said pyramid transforms fitting into a specified set of contiguous octave ranges, each pyramid transform also including a remnant baseband containing a specified range of lower-spatial-frequency content;

generating digitized representations in electrical signal form of the pyramid transform of said composite image, responsive to digitized representations in electrical signal form of portions of the pyramid images of both said overview image and said mosaiced image, including the remnant baseband of said overview image of relatively large field of view and at least one octave of higher-spatial-frequency content from said pyramid transform of the mosaiced image; and generating digitized representations in electrical signal form of said composite image as the inverse pyramid transform of its said pyramid transform.

4. A method for generating a composite image, proceeding from a less-detailed overview image of relatively large field of view and from more detailed images of relatively small fields of view, said method comprising the steps of;

combining the more detailed images to form a mosaiced detailed image in a common spatial reference frame with the overview image;

generating digitized representations of the less detailed image and the mosaiced image in electrical signal form of the pyramid transforms of each of said images as regularly sampled in two orthogonal dimensions and referred to a common spatial frame of reference, each pyramid transform including a number of levels respectively constituting descending octaves of higher-spatial-frequency content, the descending octaves of higher-spatial-frequency content of each of said pyramid transforms fitting into a specified set of contiguous octave ranges, each pyramid transform also including a remnant baseband containing a specified range of lower-spatial-frequency content;

generating digitized representations in electrical signal form of the pyramid transform of said composite image, responsive to digitized representations in electrical signal form of portions of the pyramid images of said overview image and said mosaiced image; and generating digitized representations in electrical signal form of said composite image as the inverse pyramid transform of its said pyramid transform, wherein said step of generating digitized representations in electrical signal form of the pyramid transform of said composite image comprises the substeps of:

normalizing the energy intensities of the remnant baseband of said overview image to accord with the energy intensities of the remnant baseband of said mosaiced image;

selecting, for inclusion in the pyramid transform of said composite image, the normalized remnant baseband of said pyramid transform of the overview image; and selecting, for inclusion in the pyramid transform of said composite image, the descending octaves of higher-spatial-frequency content of said pyramid transform of the mosaiced image.

5. A method for generating a composite image, proceeding from a less-detailed overview image of relatively large field of view and from more detailed images of relatively small fields of view, said method comprising the steps of;

generating digitized representations in electrical signal form of the pyramid transforms of each of said images as regularly sampled in two orthogonal dimensions and referred to a common spatial frame of reference, each pyramid transform including a number of levels respectively constituting descending octaves of higher-spatial-frequency content, the descending octaves of higher-spatial-frequency content of each of said pyramid transforms fitting into a specified set of contiguous octave ranges, each pyramid transform also including a remnant baseband containing a specified range of lower-spatial-frequency content;

splining the digitized representations in electrical signal form of the pyramid transforms of each of said detail images in accordance with the Burt-Adelson procedure, thus to generate the pyramid transform of a mosaic image as regularly sampled in two orthogonal dimensions and referred to a common spatial frame of reference, said pyramid transform of the mosaic image including a number of levels respectively constituting descending octaves of higher-spatial-frequency content fitting into said specified set of contiguous octave ranges, said pyramid transform of the mosaic image also including a remnant baseband containing said specified range of lower-spatial-frequency content;

generating digitized representations in electrical signal form of the pyramid transform of said composite image, responsive to digitized representations in electrical signal form of portions of the pyramid images of said said overview image and said mosaic image; and generating digitized representations in electrical signal form of said composite image as the inverse pyramid transform of its said pyramid transform—wherein said step of generating digitized representations in electrical signal form of the pyramid transform of said composite image comprises the substeps of:

normalizing the energy intensities of the octaves of higher-spatial-frequency content of said pyramid transform of said overview image to accord with the energy intensities of the corresponding octaves of higher-spatial-frequency content of said pyramid transform of said mosaic image;

normalizing the energy intensities of the remnant baseband of said overview image to accord with the energy intensities of the remnant baseband of said mosaic image;

selecting, for inclusion in the pyramid transform of said composite image, the descending octaves of higher-spatial-frequency content of said pyramid transform of the mosaic image for which there are no corresponding octaves of higher-spatial-frequency content of said pyramid transform of the overview image;

selecting, for inclusion in the pyramid transform of said composite image, weighted portions of each pair of corresponding octaves of higher-spatial-frequency content of said pyramid transforms of the mosaic image and the overview image; and selecting, for inclusion in the pyramid transform of said composite image, the remnant baseband of said pyramid transform of the overview image.

6. A method for generating a composite image, proceeding from a less-detailed overview image of relatively large field of view and from more detailed images of relatively small fields of view, said method comprising the steps of;

generating digitized representations in electrical signal form of the pyramid transforms of each of said images as regularly sampled in two orthogonal dimensions and referred to a common spatial frame of reference, each pyramid transform including a number of levels respectively constituting descending octaves of higher-spatial-frequency content, the descending octaves of higher-spatial-frequency content of each of said pyramid transforms fitting into a specified set of contiguous octave ranges, each pyramid transform also including a remnant baseband containing a specified range of lower-spatial-frequency content;

splining the digitized representations in electrical signal form of the pyramid transforms of each of said detail images in accordance with the Burt-Adelson procedure, thus to generate the pyramid transform of a mosaic image as regularly sampled in two orthogonal dimensions and referred to a common spatial frame of reference, said pyramid transform of the mosaic image including a number of levels respectively constituting descending octaves of higher-spatial-frequency content fitting into said specified set of contiguous octave ranges, said pyramid transform of the mosaic image also including a remnant baseband containing said specified range of lower-spatial-frequency content;

generating digitized representations in electrical signal form of the pyramid transform of said composite image, responsive to digitized representations in electrical signal form of portions of the pyramid images of said said overview image and said mosaic image; and generating digitized representations in electrical signal form of said composite image as the inverse pyramid transform of its said pyramid transform, which said step of generating digitized representations in electrical signal form of the pyramid transforms of each of said images includes the substep of:

equalizing the the energy intensities of said detailed images in their regions of overlap.

7. A method for generating a composite image as set forth in claim 6 wherein said step of generating digitized representations in electrical signal form of the pyramid transform of said composite image comprises the substeps of:

normalizing the energy intensities of the remnant baseband of said overview image to accord with the energy intensities of the remnant baseband of said mosaic image;

selecting, for inclusion in the pyramid transform of said composite image, the remnant baseband of said pyramid transform of the overview image; and selecting, for inclusion in the pyramid transform of said composite image, the descending octaves of higher-spatial-frequency content of said pyramid transform of the mosaic image.

8. A method for generating a composite image as set forth in claim 6 wherein said step of generating digitized representations in electrical signal form of the pyramid transform of said composite image comprises the substeps of:

normalizing the energy intensities of the octaves of higher-spatial-frequency content of said pyramid transform of said overview image to accord with the energy intensities of the corresponding octaves of higher-spatial-frequency content of said pyramid transform of said mosaic image;

normalizing the energy intensities of the remnant baseband of said overview image to accord with the energy intensities of the remnant baseband of said mosaic image;

selecting, for inclusion in the pyramid transform of said composite image, the descending octaves of higher-spatial-frequency content of said pyramid transform of the mosaic image for which there are no corresponding octaves of higher-spatial-frequency content of said pyramid transform of the overview image;

selecting, for inclusion in the pyramid transform of said composite image, weighted portions of each pair of corresponding octaves of higher-spatial-frequency content of said pyramid transforms of the mosaic image and the overview image; and selecting, for inclusion in the pyramid transform of said composite image, the remnant baseband of said pyramid transform of the overview image.

9. A method for generating a composite terrain map, proceeding from an overview image created by a camera at relatively high altitude and from images derived from overlapping photographs taken at relatively low altitudes above a terrain, which composite terrain map is relatively free of step irradiance variations where the images derived from overlapping photographs taken at relatively low altitudes are splined to form the composite terrain map, said method comprising the steps of:

generating digitized representations in electrical signal form of images of said overview and each of said photographs, referred to a common spatial frame of reference;

pyramid filtering the digitized representations in electrical signal form of each image, to generate, as the pyramid transform of that said image, a respective set of digitized representations in electrical signal form of two-dimensional band-pass filter responses descriptive of descending octaves of spatial frequencies and a respective two-dimensional low-pass filter response comprising spatial frequencies below a prescribed band of middle spatial frequencies, each of which sets has a number N of its respective band-pass filter responses within said prescribed band of middle spatial frequencies, N being an integer at least one, each of which sets that is the pyramid transform of an image of one of said photographs taken at relatively low altitudes including at least one respective band-pass filter response comprising spatial frequencies above said prescribed band of middle spatial frequencies;

splining in accordance with the Burt-Adelson procedure the digitized representations in electrical signal form of the pyramid transforms of said images of said photographs taken at relatively low altitudes, thus to generate, as the pyramid transform of a mosaic image, a respective set of digitized representations in electrical signal form of two-dimensional band-pass filter responses descriptive of descending octaves of spatial frequencies and a respective two-dimensional low-pass filter response comprising spatial frequencies below said prescribed band of middle spatial frequencies, which set has N of its respective band-pass filter responses within said prescribed band of middle spatial frequencies, at least one other of the respective band-pass filter responses of that set comprising spatial frequencies above said prescribed band of middle spatial frequencies;

generating digitized representations in electrical signal form of the pyramid transform of said composite image, responsive to digitized representations in electrical signal form of portions of the pyramid images of said said overview image and said mosaic image, which pyramid transform of said composite image corresponds to said composite terrain map as expressed inthe form of a pyramid transform.

10. A method for generating a composite terrain map, as set forth in claim 9, including the further step of:

generating digitized representations in electrical signal form of said composite image as the inverse pyramid transform of its said pyramid transform, thereby to generate digitized representations in electrical signal form of said composite terrain map.

11. A method for generating a composite terrain map as set forth in claim 10, included as the preliminary steps of a method for generating a digital recording of said composite terrain map, which method for generating a digital recording of said composite terrain map includes the further step of:

digitally recording on a digital recording medium said digitized representations in electrical signal form of said composite terrain map.

12. A method for generating a composite terrain map, as set forth in claim 9, wherein said step of generating digitized representations in electrical signal form of the pyramid transform of said composite image comprises the substeps of:

normalizing the energy intensity of the low-pass filter response of said overview image to accord with the energy intensity of the low-pass filter response of said mosaic image;

selecting, for inclusion in the pyramid transform of said composite image, the normalized low-pass filter response of said pyramid transform of the overview image; and selecting, for inclusion in the pyramid transform of said composite image, each of the respective band-pass filter responses of said pyramid transform of the mosaic image.

13. A method for generating a composite image as set forth in claim 9 wherein said step of generating digitized representations in electrical signal form of the pyramid transform of said composite image comprises the substeps of:

normalizing the energy intensities of the band-pass filter responses of said pyramid transform of said overview image to accord with the energy intensities of the corresponding band-pass filter responses of said pyramid transform of said mosaic image;

normalizing the energy intensity of the low-pass filter response of said overview image to accord with the energy intensity of the low-pass filter response of said mosaic image;

selecting, for inclusion in the pyramid transform of said composite image, the descending octaves of higher-spatial-frequency content of said pyramid transform of the mosaic image for which there are no corresponding octaves of higher-spatial-frequency content of said pyramid transform of the overview image;

selecting, for inclusion in the pyramid transform of said composite image, weighted portions of each pair of corresponding octaves of higher-spatial-frequency content of said pyramid transforms of the mosaic image and the overview image; and selecting, for inclusion in the pyramid transform of said composite image, the remnant baseband of said pyramid transform of the overview image.

14. A method for generating a composite image, as set forth in claim 9, wherein between said step of pyramid filtering the digitized representations in electrical signal form of each image to generate the pyramid transform of that said image and said step of splining in accordance with the Burt-Adelson procedure the digitized representations in electrical signal form of the pyramid transforms of said images of said photographs taken at relatively low altitudes to generate the pyramid transform of a mosaic image, there is included the step of:
   equalizing the the energy intensities of said images of said photographs taken at relatively low altitudes in their regions of overlap.

15. A method for generating a composite terrain map, as set forth in claim 14, wherein said step of generating digitized representations in electrical signal form of the pyramid transform of said composite image comprises the substeps of:
   normalizing the energy intensity of the low-pass filter response of said overview image to accord with the energy intensity of the low-pass filter response of said mosaic image;
   selecting, for inclusion in the pyramid transform of said composite image, the normalized low-pass filter response of said pyramid transform of the overview image; and
   selecting, for inclusion in the pyramid transform of said composite image, each of the respective band-pass filter responses of said pyramid transform of the mosaic image.

16. A method for generating a composite image as set forth in claim 14 wherein said step of generating digitized representations in electrical signal form of the pyramid transform of said composite image comprises the substeps of:
   normalizing the energy intensities of the band-pass filter responses of said pyramid transform of said overview image to accord with the energy intensities of the corresponding band-pass filter responses of said pyramid transform of said mosaic image;
   normalizing the energy intensity of the low-pass filter response of said overview image to accord with the energy intensity of the low-pass filter response of said mosaic image;
   selecting, for inclusion in the pyramid transform of said composite image, the descending octaves of higher-spatial-frequency content of said pyramid transform of the mosaic image for which there are no corresponding octaves of higher-spatial-frequency content of said pyramid transform of the overview image;
   selecting, for inclusion in the pyramid transform of said composite image, weighted portions of each pair of corresponding octaves of higher-spatial-frequency content of said pyramid transforms of the mosaic image and the overview image; and
   selecting, for inclusion in the pyramid transform of said composite image, the remnant baseband of said pyramid transform of the overview image.

* * * * *